United States Patent
Cheng et al.

(10) Patent No.: US 12,445,988 B2
(45) Date of Patent: Oct. 14, 2025

(54) MAC-CE COMMAND ACTION TIMING CONTROL IN NON-TERRESTRIAL NETWORKS

(71) Applicant: SHARP KABUSHIKI KAISHA, Sakai (JP)

(72) Inventors: Chien-Chun Cheng, Taipei (TW); Chia-Hao Yu, Taipei (TW)

(73) Assignee: SHARP KABUSHIKI KAISHA, Sakai (JP)

( * ) Notice: Subject to any disclaimer, the term of this patent is extended or adjusted under 35 U.S.C. 154(b) by 264 days.

(21) Appl. No.: 17/502,693

(22) Filed: Oct. 15, 2021

(65) Prior Publication Data
US 2022/0124660 A1 Apr. 21, 2022

Related U.S. Application Data

(60) Provisional application No. 63/092,361, filed on Oct. 15, 2020.

(51) Int. Cl.
*H04W 56/00* (2009.01)
*H04W 72/0446* (2023.01)
(Continued)

(52) U.S. Cl.
CPC ... *H04W 56/0045* (2013.01); *H04W 72/0446* (2013.01); *H04W 72/23* (2023.01); *H04W 80/02* (2013.01); *H04W 84/06* (2013.01)

(58) Field of Classification Search
CPC ......... H04W 56/0045; H04W 72/0446; H04W 72/23; H04W 80/02; H04W 84/06
See application file for complete search history.

(56) References Cited

U.S. PATENT DOCUMENTS

2019/0053228 A1* 2/2019 Akkarakaran .... H04W 72/0446
2020/0252895 A1* 8/2020 Yi ...................... H04W 56/0005
(Continued)

FOREIGN PATENT DOCUMENTS

EP 3665975 A1 6/2020
WO 2019/074311 A1 4/2019
(Continued)

OTHER PUBLICATIONS

Huawei et al., "Discussion on timing relationship enhancements for NTN", 3GPP TSG RAN WG1 Meeting #102-e E-meeting, R1-2005265, Aug. 17-28, 2020 (Year: 2020).*
(Continued)

*Primary Examiner* — Shah M Rahman
(74) *Attorney, Agent, or Firm* — ScienBiziP, P.C.

(57) ABSTRACT

Some present implementations provide a method for a user equipment (UE) connected to a non-terrestrial network (NTN). The method may receive, from a base station (BS) of the NTN at a downlink (DL) slot n, a timing advance (TA) command. The method may also adjust a timing of uplink (UL) transmissions to the BS according to the received TA command. The method may also include applying the adjusted timing for the UL transmissions by performing the UL transmissions from a beginning of a UL slot n+k+1+$K_{offset}$. $K_{offset}$ may be a common delay broadcast by the BS to a plurality of UEs connected to the NTN including the UE, and k may be an additional delay specific to the UE.

4 Claims, 8 Drawing Sheets

600

602
RECEIVE, AT A FIRST DL SLOT CORRESPONDING WITH A FIRST UL SLOT, A TA COMMAND THAT ADJUSTS A TIMING OF UL TRANSMISSIONS RELATIVE TO DL TRANSMISSIONS

604
ADJUST THE TIMING OF THE UL TRANSMISSION ACCORDING TO THE TA COMMAND BEGINNING AT A CALCULATED NUMBER OF UL SLOTS AFTER THE FIRST UL SLOT, THE CALCULATED NUMBER OF UL SLOTS INCLUDING A NUMBER OF DELAY SLOTS ASSOCIATED WITH THE NTN

(51) Int. Cl.
*H04W 72/23* (2023.01)
*H04W 80/02* (2009.01)
*H04W 84/06* (2009.01)

(56) References Cited

U.S. PATENT DOCUMENTS

| | | | |
|---|---|---|---|
| 2020/0295824 A1 | 9/2020 | Charbit et al. | |
| 2020/0351957 A1* | 11/2020 | Kim | H04W 56/0015 |
| 2021/0251012 A1* | 8/2021 | Shrestha | H04W 56/0045 |
| 2022/0007455 A1* | 1/2022 | Hong | H04W 76/28 |
| 2022/0046572 A1* | 2/2022 | Sengupta | H04B 7/1851 |
| 2022/0046575 A1* | 2/2022 | Kong | H04W 56/0045 |
| 2022/0053487 A1* | 2/2022 | Sengupta | H04W 56/00 |
| 2022/0053522 A1* | 2/2022 | MolavianJazi | H04W 72/1263 |
| 2022/0070811 A1* | 3/2022 | Tripathi | H04W 56/006 |
| 2022/0086780 A1* | 3/2022 | Tsai | H04W 56/006 |
| 2022/0174610 A1* | 6/2022 | Qiao | H04W 52/146 |
| 2022/0191898 A1* | 6/2022 | Sergeev | H04W 72/20 |
| 2022/0239417 A1* | 7/2022 | Cheng | H04L 1/1835 |
| 2022/0322265 A1* | 10/2022 | Dai | H04B 7/18543 |
| 2022/0408384 A1* | 12/2022 | Määttanen | H04W 56/005 |
| 2023/0038582 A1* | 2/2023 | Lin | H04W 72/23 |
| 2023/0049008 A1* | 2/2023 | Nishio | H04B 7/1853 |
| 2023/0156645 A1* | 5/2023 | Yao | H04B 7/1851 |
| | | | 455/12.1 |
| 2023/0156646 A1* | 5/2023 | Yao | H04W 56/0045 |
| | | | 370/329 |
| 2023/0247683 A1* | 8/2023 | Lin | H04W 74/0841 |
| | | | 370/329 |
| 2023/0275705 A1* | 8/2023 | Muruganathan | H04L 1/1861 |
| | | | 370/329 |
| 2023/0300770 A1* | 9/2023 | Liu | H04B 7/1851 |
| | | | 370/350 |

FOREIGN PATENT DOCUMENTS

| | | |
|---|---|---|
| WO | 2019/143900 A1 | 7/2019 |
| WO | 2019/168826 A1 | 9/2019 |

OTHER PUBLICATIONS

Nokia et al., "Remaining details on NR Random Access", 3GPP TSG-RAN WG1#94 Gothenburg, Sweden, Aug. 20-24, 2018, R1-1808965.

Qualcomm Incorporated, "Summary of Rel.15 maintenance for Scheduling and HARQ", 3GPP TSG RAN WG1 Meeting #98 Prague, Czech, Aug. 26 - 30, 2019, R1-1909522.

Qualcomm Incorporated, "Clarifications on NR time ambiguity", 3GPP RAN1 #98 Prague, CZ Aug. 26-30, 2019, R1-1909237.

Qualcomm Incorporated, "Offline summary for maintenance for scheduling and HARQ management", 3GPP TSG RAN WG1 Meeting #98bis Chongqing, China, Oct. 14-20, 2019, R1-1911583.

3GPP TS 38.214, "3rd Generation Partnership Project; Technical Specification Group Radio Access Network; NR; Physical layer procedures for data (Release 16)", V16.2.0 (Jun. 2020).

3GPP TS 38.213, "3rd Generation Partnership Project; Technical Specification Group Radio Access Network; NR; Physical layer procedures for control (Release 16)", V16.2.0 (Jun. 2020).

3GPP TS 38.133, "3rd Generation Partnership Project; Technical Specification Group Radio Access Network; NR; Requirements for support of radio resource management (Release 16)", V16.0.0 (Jun. 2019).

3GPP TS 38.321, "3rd Generation Partnership Project; Technical Specification Group Radio Access Network; NR; Medium Access Control (MAC) protocol specification (Release 16)", V16.1.0 (Jul. 2020).

3GPP TS 38.211, "3rd Generation Partnership Project; Technical Specification Group Radio Access Network; NR; Physical channels and modulation (Release 16)", V16.2.0 (Jun. 2020).

3GPP TR 38.821, "3rd Generation Partnership Project; Technical Specification Group Radio Access Network; Solutions for NR to support non-terrestrial networks (NTN) (Release 16)", V16.0.0 (Dec. 2019).

Ericsson, "Maintenance for physical random access channel and procedure", 3GPP TSG-RAN WG1 Meeting #94 Gothenburg, Sweden, Aug. 20-24, 2018, R1-1809257.

International Search Report dated Jan. 5, 2022 for International Application No. PCT/CN2021/124117 which is the family application of the instant application.

Asia Pacific Telecom et al: "Timing relationship enhancements in Ntn", R1-2102732, 3GPP TSG RAN WG1#104bis-e, e-Meeting, Apr. 12-Apr. 20, 2021 (Apr. 7, 2021), section 2.2.

Oppo, "Discussion on timing relationship enhancement", R1-2102397, 3GPP TSG RAN WG1 #104b-e, e-Meeting, Apr. 12-20, 2021 (Apr. 7, 2021), section 1, 2.

Lenovo et al.: "Discussion on NTN timing relationship", R1-2103532, 3GPP TSG RAN WG1 #104b-e, e-Meeting, Apr. 12-20, 2021 (Apr. 7, 2021).

Asia Pacific Telecom et al.: "Timing relationship enhancements in NTN", R1-2100971, 3GPP TSG RAN WG1#104-e, e-Meeting, Jan. 25-Feb. 5, 2021 (Jan. 19, 2021), sections 1, 2.

* cited by examiner

MAC-CE COMMAND ACTION TIMING CONTROL IN NON-TERRESTRIAL NETWORKS

CROSS-REFERENCE TO RELATED APPLICATION(S)

The present application claims the benefit of and priority to U.S. Provisional Patent Application No. 63/092,361, filed on Oct. 15, 2020, entitled "MAC CE TIMING RELATIONSHIP ENHANCEMENT IN NTN," the content of which is hereby incorporated fully by reference into the present application.

FIELD

The present disclosure generally relates to wireless communications, and more particularly, to improving the action timing of a Media Access Control (MAC) Control Element (CE) (MAC-CE) command received at a user equipment (UE) operating in a non-terrestrial network (NTN).

BACKGROUND

With the tremendous growth in the number of connected devices and the rapid increase in user/network traffic volume, various efforts have been made to improve various aspects of wireless communication for next-generation wireless communication systems, such as 5th Generation (5G) New Radio (NR), by improving data rate, latency, reliability, and mobility. The 5G NR system is designed to provide flexibility and configurability to optimize the network services and types, accommodating various use cases, such as enhanced Mobile Broadband (eMBB), massive Machine-Type Communication (mMTC), and Ultra-Reliable and Low-Latency Communication (URLLC).

In addition, various technical aspects of 5G NR systems (e.g., as specified in recent NR specification releases of the 3$^{rd}$ Generation Partnership Project (3GPP)) are being applied to non-terrestrial networks (NTNs), in which one or more nodes of the network may be located at distances will above ground level. In some cases, the communication signal propagation delays introduced by those distances may create circumstances that were not fully anticipated in previous specification releases.

SUMMARY

The present disclosure is directed to improving the action timing of a MAC-CE command received at a UE operating in an NTN.

In a first aspect of the present disclosure, a method for a user equipment (UE) connected to a non-terrestrial network (NTN) is provided. The method may include receiving, from a base station (BS) of the NTN at a downlink (DL) slot n, a timing advance (TA) command. The method may also include adjusting a timing of uplink (UL) transmissions to the BS according to the received TA command. The method may further include applying the adjusted timing for the UL transmissions by performing the UL transmissions from a beginning of a UL slot $n+k+1+K_{offset}$. In some implementations, $K_{offset}$ may be a common delay broadcast by the BS to a plurality of UEs connected to the NTN including the UE, and k may be an additional delay specific to the UE.

In an implementation of the first aspect, the method may further include receiving, from the BS, a value for $K_{offset}$ via system information (SI).

In another implementation of the first aspect, the method may further include receiving, from the BS, a value for k via radio resource control (RRC) signaling.

In a second aspect of the present disclosure, a UE connected to an NTN may include one or more non-transitory computer-readable media having computer-executable instructions. The UE may also include at least one processor coupled to the one or more non-transitory computer-readable media, and configured to execute the computer-executable instructions to cause the UE to receive, from a BS of the NTN at a DL slot n, a TA command. The computer-readable instructions may also cause the UE to adjust a timing of UL transmissions to the BS according to the received TA command. Further, the computer-readable instructions may cause the UE to apply the adjusted timing for the UL transmissions by performing the UL transmissions from a beginning of a UL slot $n+k+1+K_{offset}$. In some implementations, $K_{offset}$ may be a common delay broadcast by the BS to a plurality of UEs connected to the NTN including the UE, and k may be an additional delay specific to the UE.

In an implementation of the second aspect, the computer-executable instructions may further cause the UE to receive, from the BS, a value for $K_{offset}$ via system information (SI).

In another implementation of the second aspect, the computer-executable instructions may further cause the UE to receive, from the BS, a value for k via radio resource control (RRC) signaling.

In a third aspect of the present disclosure, a method for a user equipment (UE) connected to a non-terrestrial network (NTN) is provided. The method may include receiving, from a base station (BS) at a first downlink (DL) slot of a physical downlink shared channel (PDSCH), a media access control (MAC) control element (CE) (MAC-CE) command. The first DL slot may correspond to a first uplink (UL) slot of a physical uplink shared channel (PUSCH) in logical time. The method may also include, in a case that the PDSCH and the PUSCH are nonaligned at the BS, and the MAC-CE command is to be applied to the PDSCH, activating the MAC-CE command at a second DL slot that is a first calculated number of slots after the first DL slot. The first calculated number of slots may include a number of delay slots associated with at least one MAC-CE command when the PDSCH and the PUSCH are nonaligned at the BS.

In an implementation of the third aspect, the first calculated number of slots after the first DL slot may be $k_{mac}+k+1$. In some implementations, $k_{mac}$ may be the number of delay slots associated with the at least one MAC-CE command when the PDSCH and the PUSCH are nonaligned at the BS, and k may be an additional offset.

In another implementation of the third aspect, the method may further include, in a case that the PDSCH and the PUSCH are aligned at the BS, and the MAC-CE command is to be applied to the PDSCH, activating the MAC-CE command at a third DL slot that is a second calculated number of slots after the first DL slot, the second calculated number of slots not including the number of delay slots associated with the at least one MAC-CE command.

In another implementation of the third aspect, the method may further include, in a case that the MAC-CE command is to be applied to the PUSCH, activating the MAC-CE command at a second UL slot that is a second calculated number of slots after the first UL slot, the second calculated number of slots not including the number of delay slots associated with the at least one MAC-CE command.

In a fourth aspect of the present disclosure, a UE connected to an NTN may include one or more non-transitory computer-readable media having computer-executable instructions. The UE may further include at least one processor may be coupled to the one or more non-transitory computer-readable media, and configured to execute the computer-executable instructions to cause the UE to receive, from a BS at a first DL slot of a PDSCH, a MAC-CE command, the first DL slot corresponding to a first UL slot of a PUSCH in logical time. The computer-executable instructions may also cause the UE to, in a case that the PDSCH and the PUSCH are nonaligned at the BS, and the MAC-CE command is to be applied to the PDSCH, activate the MAC-CE command at a second DL slot that is a first calculated number of slots after the first DL slot, the first calculated number of slots including a number of delay slots associated with at least one MAC-CE command when the PDSCH and the PUSCH are nonaligned at the BS.

In an implementation of the fourth aspect, the first calculated number of slots after the first DL slot may be $k_{mac}+k+1$. In some implementations, $k_{mac}$ may be the number of delay slots associated with the at least one MAC-CE command when the PDSCH and the PUSCH are nonaligned at the BS, and k may be an additional offset.

In another implementation of the fourth aspect, the computer-executable instructions may further cause the UE to, in a case that the PDSCH and the PUSCH are aligned at the BS, and the MAC-CE command is to be applied to the PDSCH, activate the MAC-CE command at a third DL slot that is a second calculated number of slots after the first DL slot, the second calculated number of slots not including the number of delay slots associated with the at least one MAC-CE command.

In another implementation of the fourth aspect, the computer-executable instructions may further cause the UE to, in a case that the MAC-CE command is to be applied to the PUSCH, activate the MAC-CE command at a second UL slot that is a second calculated number of slots after the first UL slot, the second calculated number of slots not including the number of delay slots associated with the at least one MAC-CE command.

BRIEF DESCRIPTION OF THE DRAWINGS

Aspects of the exemplary disclosure are best understood from the following detailed description when read with the accompanying figures. Various features are not drawn to scale, and dimensions of various features may be arbitrarily increased or reduced for clarity of discussion.

DETAILED DESCRIPTION

Figure 1:
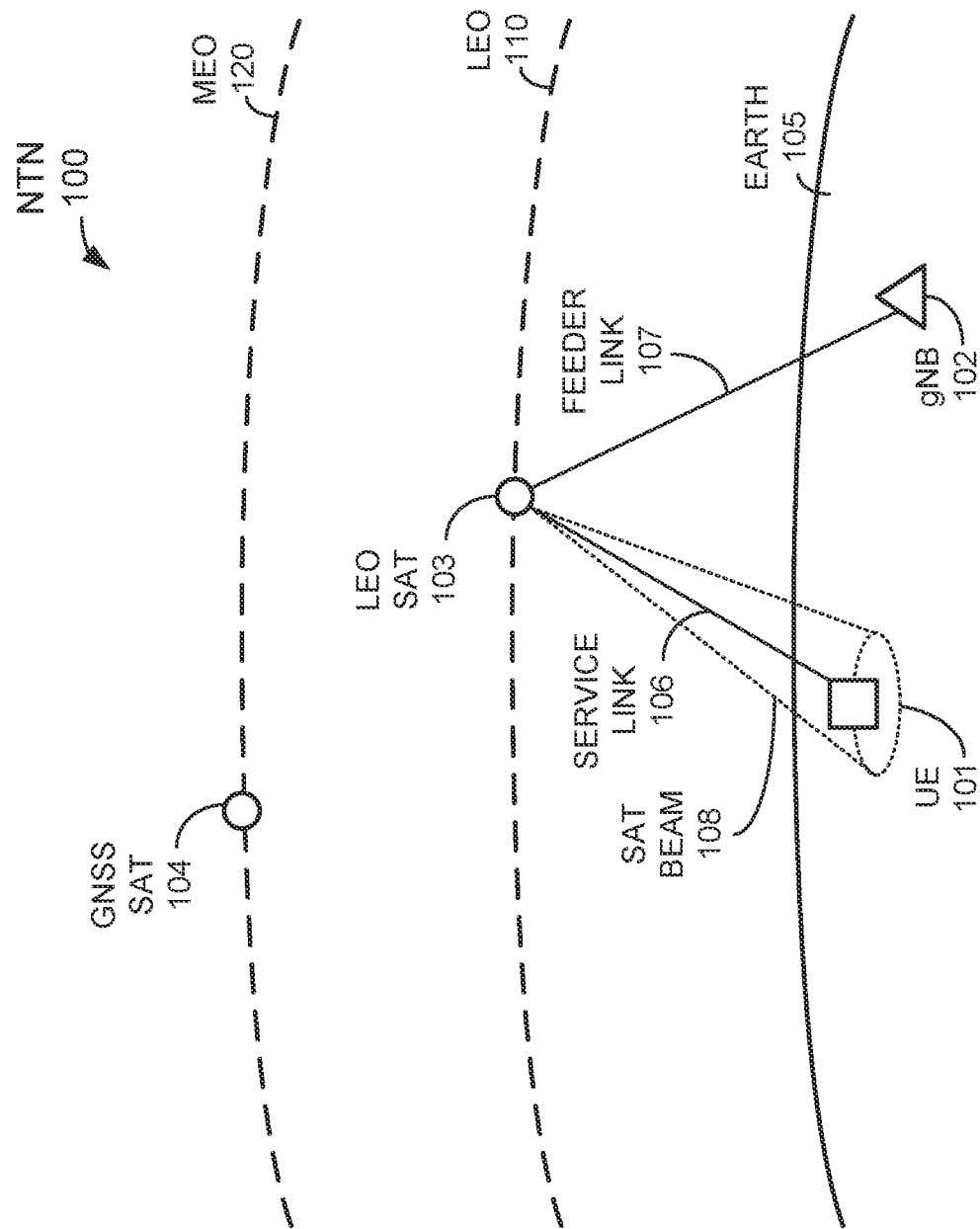
FIG. 1 is a diagram illustrating a portion of an NTN employing one or more satellites, according to an example implementation of the present disclosure.

The acronyms in the present application are defined as follows and unless otherwise specified, the acronyms have the following meanings:

| Acronym | Full name |
| --- | --- |
| 3GPP | $3^{rd}$ Generation Partnership Project |
| 5G | $5^{th}$ Generation |
| 5GC | $5^{th}$ Generation Core |
| 5G-S-TMSI | 5G Serving Temporary Mobile Subscriber Identity |
| ACK | Acknowledgment |
| Alt | Alternative |
| AMF | Access and Mobility Management Function |
| AoA | Angle of Arrival |
| AoD | Angle of Departure |
| AS | Access Stratum |
| BL | Band-Limited |
| BPSK | Binary Phase Shift Keying |
| BS | Base Station |
| CA | Carrier Aggregation |
| CB | Contention-Based |
| CC | Component Carrier |
| CCCH | Common Control Channel |
| CCE | Control Channel Element |
| CE | Control Element |
| CF | Contention-Free |
| CG | Configured grant |
| CG-DFI | CG Downlink Feedback Information |
| CG-UCI | CG Uplink Control Information |
| CLI | Cross Link Interference |
| CN | Core Network |
| CORESET | Control Resource Set |
| CP | Cyclic Prefix |
| CRC | Cyclic Redundancy Check |
| CRI | CSI-RS Resource Index |
| C-RNTI | Cell Radio Network Temporary Identifier |
| CSI | Channel State Information |
| CSI-RS | Channel State Information-based Reference Signal |
| CSI-IM | Channel State Information-based Interference Measurement |
| CSI-RSRP | Channel State Information-based Reference Signal Received Power |
| DAI | Downlink Assignment Index |
| DC | Downlink Control |
| DCI | Downlink Control Information |

| Acronym | Full name |
| --- | --- |
| DFT | Direct Fourier Transform |
| DL | Downlink |
| DL-SCH | Downlink Shared Channel |
| DMRS | Demodulation Reference Signal |
| DRX | Discontinuous Reception |
| E-CID | Enhanced Cell ID |
| EDT | Early Data Transmission |
| EPC | Evolved Packet Core |
| E-UTRA | Evolved-Universal Terrestrial Radio Access |
| FDD | Frequency Division Duplexing |
| FR | Frequency Range |
| eNB | evolved Node B (e.g., 4G Node B) |
| gNB | next-generation Node B (e.g., 5G Node B) |
| HARQ | Hybrid Automatic Repeat Request |
| IAB | Integrated Access and Backhaul |
| IE | Information Element |
| IFFT | Inverse Fast Fourier Transform |
| LBT | Listen Before Talk |
| LCID | Logical Channel ID |
| LDPC | Low-Density Parity Check |
| LRR | Link Recovery Request |
| LTE | Long-Term Evolution |
| MAC | Medium Access Control |
| MIB | Master Information Block |
| MIMO | Multiple Input, Multiple Output |
| MPE | Maximum Permissible Exposure |
| MSG | Message |
| MU-MIMO | Multiple-User Multiple Input, Multiple Output |
| NAK | Non-Acknowledgement |
| NCGI | NR Cell Global Identifier |
| NG-RAN | Next-Generation - Radio Access Network |
| NR | New Radio (or Radio Access Technology (RAT)) |
| NW | Network |
| OFDM | Orthogonal Frequency Division Multiplex |
| PBCH | Physical Broadcast Channel |
| PCell | Primary Cell |
| PDCCH | Physical Downlink Control Channel |
| PDSCH | Physical Downlink Shared Channel |
| PDU | Packet Data Unit |
| PH | Power Headroom |
| PHY | Physical Broadcast Channel |
| PRACH | Physical Random Access Channel |
| PRB | Physical Resource Block |
| PRG | Precoding Resource Block Group |
| PRS | Positioning Reference Signal |
| P-RNTI | Paging Radio Network Temporary Identifier |
| PSCell | Primary Secondary Cell |
| PSS | Primary Synchronization Signal |
| PTAG | Primary TAG |
| PTRS | Phase-Tracking Reference Signal |
| PUCCH | Physical Uplink Control Channel |
| PUSCH | Physical Uplink Shared Channel |
| PUR | Preconfigured UL Resource |
| QCL | Quasi-Colocation |
| QPSK | Quadrature Phase Shift Keying |
| RA | Random Access |
| RACH | Random Access Channel |
| RAN | Radio Access Network |
| RAPID | Random Access Preamble Index |
| RAR | Random Access Response |
| RAT | Radio Access Technology |
| RA-RNTI | Random Access Radio Network Temporary Identifier |
| RMSI | Remaining Minimum System Information |
| RNA | RAN-based Notification Area |
| RNTI | Radio Network Temporary Identifier |
| RRC | Radio Resource Control |
| RS | Reference Signal |
| RSRP | Reference Signal Received Power |
| RSRQ | Reference Signal Received Quality |
| RSTD | Reference Signal Time Difference |
| RTOA | Relative Time of Arrival |
| RTT | Round-Trip Time |
| RX | Reception |
| SCell | Secondary Cell |
| SCG | Secondary Cell Group |
| SCS | Subcarrier Spacing |
| SDU | Service Data Unit |
| SFN | System Frame Number |
| SI | System Information |
| SIB | System Information Block |
| SINR | Signal to Interference plus Noise Ratio |
| SR | Scheduling Request |
| SRS | Sounding Reference Signal |
| STAG | Secondary TAG |
| SpCell | Special Cell |
| SS | Synchronization Signal |
| SSB | Synchronization Signal Block |
| SSS | Secondary Synchronization Signal |
| SS-RSRP | Synchronization Signal-Reference Signal Received Power |
| SU-MIMO | Single-User Multiple Input, Multiple Output |
| SUL | Supplementary Uplink |
| TA | Timing Advance or Time Alignment |
| TAG | Time Alignment Group |
| TB | Transport Block |
| TBS | Transport Block Size |
| TCI | Transmission Configuration Indicator |
| TDD | Time Division Duplexing |
| TDOA | Time Difference of Arrival |
| TRP | Transmission/Reception Point |
| TS | Technical Specification |
| TTI | Transmission Time Interval |
| TX | Transmission |
| UCI | Uplink Control Information |
| UE | User Equipment |
| UL | Uplink |
| UL-SCH | Uplink Shared Channel |
| UPF | User Plane Function |

The following description contains specific information pertaining to example implementations in the present disclosure. The drawings in the present disclosure and their accompanying detailed description are directed to merely example implementations. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale and are not intended to correspond to actual relative dimensions.

For the purposes of consistency and ease of understanding, like features may be identified (although, in some examples, not shown) by the same numerals in the example figures. However, the features in different implementations may be differed in other respects, and thus shall not be narrowly confined to what is shown in the figures.

Any two or more than two of the following paragraphs, (sub)-bullets, points, actions, or claims described in each embodiment/implementation/concept may be combined logically, reasonably, and properly to form a specific method. Also, any sentence, paragraph, (sub)-bullet, point, action, or claim described in each of the following embodiment(s)/implementation(s)/concept(s) may be implemented independently and separately to form a specific method. Dependency (e.g., "based on", "more specifically", "where"; etc.) in the following embodiment(s)/implementation(s)/concept(s) is just one possible embodiment which would not restrict the specific method.

The description uses the phrases "in one implementation," or "in some implementations," which may each refer to one or more of the same or different implementations. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent. The expression "at least one of A, B and C" or "at least one of the following: A, B and C" means "only A, or only B, or only C, or any combination of A, B and C."

Additionally, for the purposes of explanation and non-limitation, specific details, such as functional entities, techniques, protocols, standard, and the like are set forth for providing an understanding of the described technology. In other examples, detailed description of well-known methods, technologies, systems, architectures, and the like are omitted so as not to obscure the description with unnecessary details.

Persons skilled in the art will immediately recognize that any network function(s) or algorithm(s) described in the present disclosure may be implemented by hardware, software or a combination of software and hardware. Described functions may correspond to modules which may be software, hardware, firmware, or any combination thereof. The software implementation may comprise computer executable instructions stored on computer readable medium such as memory or other type of storage devices. For example, one or more microprocessors or general-purpose computers with communication processing capability may be programmed with corresponding executable instructions and carry out the described network function(s) or algorithm(s). The microprocessors or general-purpose computers may be formed of Application-Specific Integrated Circuitry (ASIC), programmable logic arrays, and/or using one or more Digital Signal Processor (DSPs). Although some of the example implementations described in this specification are oriented to software installed and executing on computer hardware, nevertheless, alternative example implementations implemented as firmware or as hardware or combination of hardware and software are well within the scope of the present disclosure.

The computer readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture (e.g., a Long-Term Evolution (LTE) system, an LTE-Advanced (LTE-A) system, an LTE-Advanced Pro system, or a 5G NR Radio Access Network (RAN)) typically includes at least one base station, at least one User Equipment (UE), and one or more optional network elements that provide connection towards a network. The UE communicates with the network (e.g., a Core Network (CN), an Evolved Packet Core (EPC) network, an Evolved Universal Terrestrial Radio Access Network (E-UTRAN), a 5G Core (5GC), or an internet), through a RAN established by one or more base stations.

It should be noted that, in the present application, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, a vehicle, or a Personal Digital Assistant (PDA) with wireless communication capability. The UE is configured to receive and transmit signals over an air interface to one or more cells in a radio access network.

A base station may be configured to provide communication services according to at least one of the following Radio Access Technologies (RATs): Worldwide Interoperability for Microwave Access (WiMAX), Global System for Mobile communications (GSM, often referred to as 2G), GSM Enhanced Data rates for GSM Evolution (EDGE) Radio Access Network (GERAN), General Packet Radio Service (GPRS), Universal Mobile Telecommunication System (UMTS, often referred to as 3G) based on basic wideband-code division multiple access (W-CDMA), high-speed packet access (HSPA), Long-Term Evolution (LTE), LTE-A, eLTE (evolved LTE, e.g., LTE connected to 5GC), New Radio (NR, often referred to as 5G), and/or LTE-A Pro. However, the scope of the present application should not be limited to the above-mentioned protocols.

A base station may include, but is not limited to, a node B (NB) as in the UMTS, an evolved node B (eNB) as in the LTE or LTE-A, a radio network controller (RNC) as in the UMTS, a base station controller (BSC) as in the GSM/GSM Enhanced Data rates for GSM Evolution (EDGE) Radio Access Network (GERAN), a next-generation eNB (ng-eNB) as in an Evolved Universal Terrestrial Radio Access (E-UTRA) BS in connection with the 5GC, a next-generation Node B (gNB) as in the 5G Access Network (5G-AN), and any other apparatus capable of controlling radio communication and managing radio resources within a cell. The BS may connect to serve the one or more UEs through a radio interface to the network.

The base station may be operable to provide radio coverage to a specific geographical area using a plurality of cells included in the RAN. The BS may support the operations of the cells. Each cell may be operable to provide services to at least one UE within its radio coverage. Specifically, each cell (often referred to as a serving cell) may provide services to serve one or more UEs within its radio coverage (e.g., each cell schedules the Downlink (DL) and optionally Uplink (UL) resources to at least one UE within its radio coverage for DL and optionally UL packet transmission). The BS may communicate with one or more UEs in the radio communication system through the plurality of cells.

A cell may allocate sidelink (SL) resources for supporting Proximity Service (ProSe) or Vehicle to Everything (V2X) services. Each cell may have overlapped coverage areas with other cells. In Multi-RAT Dual Connectivity (MR-DC) cases, the primary cell of a Master Cell Group (MCG) or a Secondary Cell Group (SCG) may be referred to as a Special Cell (SpCell). A Primary Cell (PCell) may refer to the SpCell of an MCG. A Primary SCG Cell (PSCell) may refer to the SpCell of an SCG. MCG may refer to a group of serving cells associated with the Master Node (MN), including the SpCell and optionally one or more Secondary Cells (SCells). An SCG may refer to a group of serving cells associated with the Secondary Node (SN), including the SpCell and optionally one or more SCells.

As discussed above, the frame structure for NR is to support flexible configurations for accommodating various next generation (e.g., 5G) communication requirements, such as Enhanced Mobile Broadband (eMBB), Massive Machine Type Communication (mMTC), Ultra-Reliable and Low-Latency Communication (URLLC), while fulfilling high reliability, high data rate and low latency requirements. The Orthogonal Frequency-Division Multiplexing (OFDM) technology as agreed in 3GPP may serve as a baseline for NR waveform. The scalable OFDM numerology, such as the adaptive sub-carrier spacing, the channel bandwidth, and the Cyclic Prefix (CP) may also be used. Additionally, two coding schemes are considered for NR: (1) Low-Density Parity-Check (LDPC) code and (2) Polar Code. The coding scheme adaption may be configured based on the channel conditions and/or the service applications.

Moreover, it is also considered that in a transmission time interval TX of a single NR frame, a downlink (DL) transmission data, a guard period, and an uplink (UL) transmission data should at least be included, where the respective portions of the DL transmission data, the guard period, the UL transmission data should also be configurable, for example, based on the network dynamics of NR. In addition, sidelink resources may also be provided in an NR frame to support ProSe services or V2X services.

In addition, the terms "system" and "network" herein may be used interchangeably. The term "and/or" herein is only an association relationship for describing associated objects, and represents that three relationships may exist. For example, A and/or B may indicate that: A exists alone, A and B exist at the same time, or B exists alone. In addition, the character "/" herein generally represents that the former and latter associated objects are in an "or" relationship.

As discussed above, the next-generation (e.g., 5G NR) wireless network is envisioned to support more capacity, data, and services. A UE configured with multi-connectivity may connect to a Master Node (MN) as an anchor and one or more Secondary Nodes (SNs) for data delivery. Each one of these nodes may be formed by a cell group that includes one or more cells. For example, an MN may be formed by a Master Cell Group (MCG), and an SN may be formed by a Secondary Cell Group (SCG). In other words, for a UE configured with dual connectivity (DC), the MCG is a set of one or more serving cells including the PCell and zero or more secondary cells. Conversely, the SCG is a set of one or more serving cells including the PSCell and zero or more secondary cells.

As also described above, the Primary Cell (PCell) may be an MCG cell that operates on the primary frequency, in which the UE either performs the initial connection establishment procedure or initiates the connection reestablishment procedure. In the MR-DC mode, the PCell may belong to the MN. The Primary SCG Cell (PSCell) may be an SCG cell in which the UE performs random access (e.g., when performing the reconfiguration with a sync procedure). In MR-DC, the PSCell may belong to the SN. A Special Cell (SpCell) may be referred to a PCell of the MCG, or a PSCell of the SCG, depending on whether the Medium Access Control (MAC) entity is associated with the MCG or the SCG. Otherwise, the term Special Cell may refer to the PCell. A Special Cell may support a Physical Uplink Control Channel (PUCCH) transmission and contention-based Random Access and may always be activated. Additionally, for a UE in an RRC_CONNECTED state that is not configured with the CA/DC, may communicate with only one serving cell (SCell) which may be the primary cell. Conversely, for a UE in the RRC_CONNECTED state that is configured with the CA/DC a set of serving cells including the special cell(s) and all of the secondary cells may communicate with the UE.

Non-Terrestrial Networks (NTNs)

Non-terrestrial networks (NTN) may refer to networks, or segments of networks, using a spaceborne vehicle for transmission (e.g., using low Earth orbit (LEO) satellites). In the 3GPP Release 17 (Rel-17) NTN working item (WI), a transparent payload-based LEO scenario addresses at least 3GPP class 3 user equipment (UE) with Global Navigation Satellite System (GNSS) capability. "Transparent payload-based LEO network (NW)" may refer to a relay-based NTN. In this case, the LEO satellites simply perform amplify-and-forward operations in space, and the base station (gNB) is located on the ground connected to the core NW. An orbit of 600 kilometers (km) has been considered in the WI. "3GPP class 3 UE" may refer to Power Class UE 3. The definition is used for the uplink (UL) transmit (TX) power level set to be 23 decibel-milliwatts (dBm) with a range of plus-or-minus 2 decibels (dB). This setting was mainly driven to ensure backward compatibility with prior technologies (e.g., Rel-15 NR/GSM/UMTS) so that network deployment topologies remain similar. "Global Navigation Satellite System (GNSS)" may refer to the standard generic term for satellite navigation systems that provide autonomous geospatial positioning with global coverage. This term may include, for example, Global Positioning System (GPS), GLONASS, Galileo, Beidou, and other regional systems. The GNSS is usually operated on an orbit of 20200 km.

FIG. 1 is a diagram illustrating a portion of an NTN 100 employing at least one LEO satellite 103, according to an example implementation of the present application disclosure. In some implementations, NTN 100 may represent a transparent payload deployment in which LEO satellite 103 at an LEO 110 serves as a relay between a UE 101 and a gNB 102 located on Earth 105 by way of a service link 106 between UE 101 and LEO satellite 103 and a feeder link 107 between LEO satellite 103 and gNB 102. Further, a satellite beam 108 may be an optical or radio frequency beam generated by transmitter and corresponding antenna onboard LEO satellite 103. In some implementations, a diameter of satellite beam 108 on Earth 105 may range from 50 km to 1000 km, which may result in significant differential delay among multiple UEs 101 in service. Also shown in FIG. 1 is a GNSS satellite 104 at a medium Earth orbit (MEO) 120.

Figure 2:
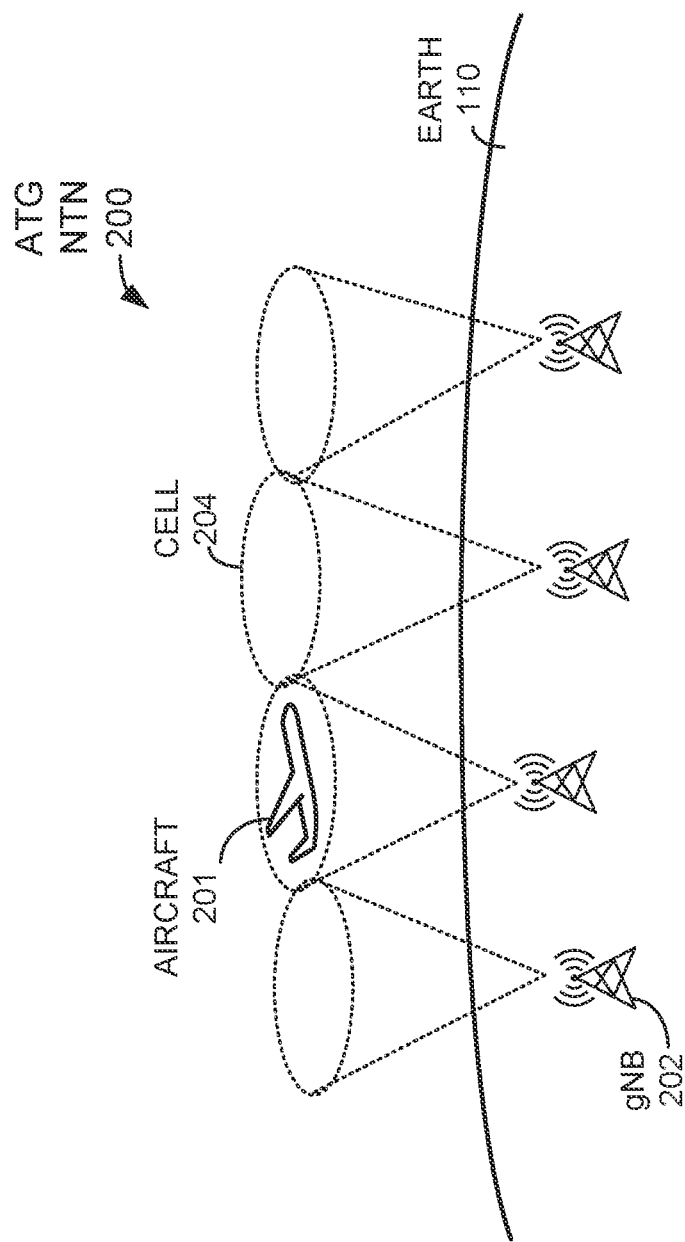
FIG. 2 is a diagram illustrating a portion of an Air-to-Ground (ATG) network employing NTN aspects, according to an example implementation of the present disclosure.

FIG. 2 is a diagram illustrating a portion of an Air-to-Ground (ATG) NTN 200, according to an example implementation of the present disclosure. ATG NTN 200 may also be included in the NTN framework, with ATG network 200 referring to an in-flight connectivity technique, using ground-based cell towers that send signals up to one or more antennas of an ATG terminal of an aircraft 201. As aircraft 201 travels into different sections of airspace, the onboard ATG terminal may automatically connect to the cell with the strongest received signal power, just as a mobile phone does on the ground. ATG gNB 202 may be deployed on the ground, with antennas pointing upward to form an aerial cell, while aircraft 201 performs as a special UE. In ATG NTN 200, an "air interface" may refer to the connection between ATG gNB 202 and aircraft 201, while a connection between aircraft and passengers might be based on Wi-Fi technology. Like NTN 100 of FIG. 1, ATG NTN 200 may handle extremely large cell coverage ranges (e.g., up to 300 km) and high aircraft 201 speeds (e.g., up to 1200 kilometers per hour (km/h)).

Timing Relationships for NTN

Figure 3A:
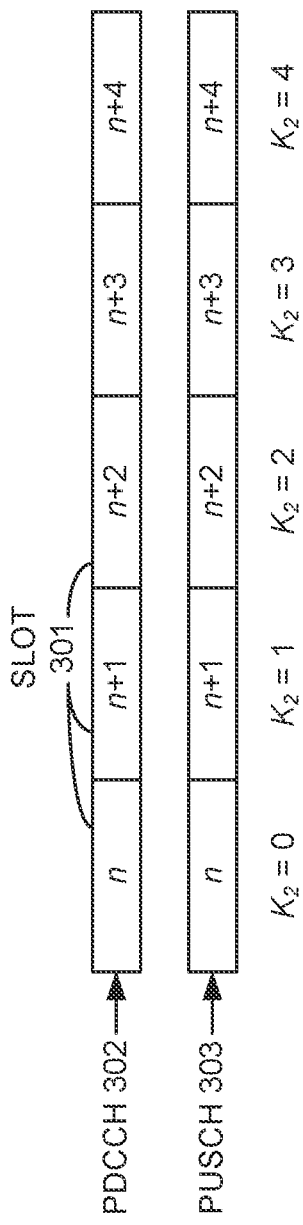
FIG. 3A is a timing diagram illustrating a timing relationship between a Physical Downlink Control Channel (PDCCH) and an associated Physical Uplink Shared Channel (PUSCH) when a Timing Advance (TA) is presumed to be zero, according to an example implementation of the present disclosure.
Figure 3B:
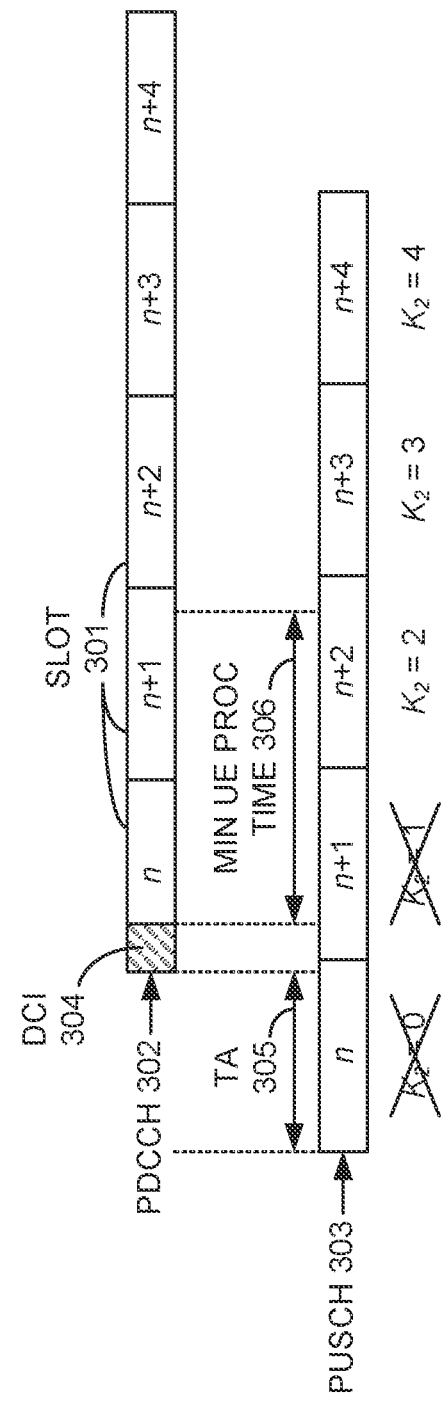
FIG. 3B is a timing diagram illustrating a timing relationship between a PDCCH and a PUSCH when a TA is not zero, according to an example implementation of the present disclosure.

During the Rel-16 NTN Study Item (SI), researchers identified an offset $K_{offset}$ that may be introduced to enhance several timing relationships (e.g., for the transmission timing of Downlink Control Information (DCI)-scheduled Physical Uplink Shared Channel (PUSCH), for the transmission timing of Hybrid Automatic Repeat Request-Acknowledgment (HARQ-ACK) on a Physical Uplink Control Channel (PUCCH), for MAC-CE action timing, etc.). As used herein, "action timing" may refer to the time (e.g., in reference to a slot) at which the associated command (e.g., a MAC-CE command) is applied or begins to take effect. FIGS. 3A and 3B provide an example of a PUSCH scheduling timing relationship that may benefit from the use of $K_{offset}$.

For example, FIG. 3A is a timing diagram illustrating a timing relationship between a Physical Downlink Control Channel (PDCCH) 302 and an associated PUSCH 303 when a timing advance (TA) is presumed to be zero, according to an example implementation of the present disclosure. PDCCH 302 and PUSCH 303 each may define a number of time segments, or slots 301. When the UE is scheduled to transmit PUSCH 303, as determined by DCI received in PDCCH 302, the DCI may indicate, among other parameters, a slot offset $K_2$. The resulting slot allocated to the UE for the PUSCH may be $$\left\lfloor n \cdot \frac{2^{\mu PUSCH}}{2^{\mu PDCCH}} \right\rfloor + K_2,$$

where n is me slot with the scheduling DCI, $K_2$ is based on the numerology of PUSCH, and $\mu_{PUSCH}$ and $\mu_{PDCCH}$ are the Subcarrier Spacing (SCS) configurations for the PUSCH and the PDCCH, respectively. In FIG. 3A, in addition to a TA of zero, the amount of UE processing time required to process the DCI is also presumed to be zero. Consequently, in this example, when the DCI is received in slot n, the PUSCH slot for the UE is n for $K_2=0$, n+1 for $K_2=1$, n+2 for $K_2=2$, and so on.

FIG. 3B is a timing diagram illustrating a timing relationship between a PDCCH and a PUSCH (e.g., as seen at the UE) when a TA 305 is not zero, according to an example implementation of the present disclosure. More specifically, at the UE, the timing of PUSCH 303 may be advanced by an amount of TA 305 relative to PDCCH 302. Additionally, a minimum UE processing time 306 for a DCI 304 is also presumed, resulting in a more realistic scenario. Consequently, some values for $K_2$ (e.g., $K_2=0$ and $K_2=1$) may be rendered invalid as they represent an insufficient amount of offset to facilitate scheduling of the UE to transmit over PUSCH 303 in a useful slot 301 after the reception of DCI 304. Therefore, when TA 305 becomes large (e.g., in an NTN), the cardinality of the set of useful values of $K_2$ may be reduced significantly (e.g., possibly to zero) Similar issues may also exist in several other timing relationships aside from PUSCH scheduling, such as MAC-CE action timing.

MAC-CE Action Timing Relationship

During the Rel-16 NTN SI, an additional offset $K_{offset}$ was introduced to enhance various timing relationships, as indicated in the Technical Report (TR) excerpts shown in Table 1:

becomes active after reception. 3GPP technical specifications are not explicit on the subject. According to some specifications, the UE may assume a MAC-CE command becoming active 3 milliseconds (ms) after the UE transmits a HARQ-ACK corresponding to a received PDSCH carrying the MAC-CE command In some examples, the value of 3 ms may be derived from $3N_{slot}^{subframe,\mu}=3$ slots by setting $\mu=0$ as a subcarrier spacing (SCS) equal to 15 kilohertz (kHz), as the $SCS=2^\mu \times 15$ kHz. In other examples, setting $\mu=1$ results in an SCS of 30 kHz, setting $\mu=2$ results in an SCS of 60 kHz, and so on.

Figure 4A:
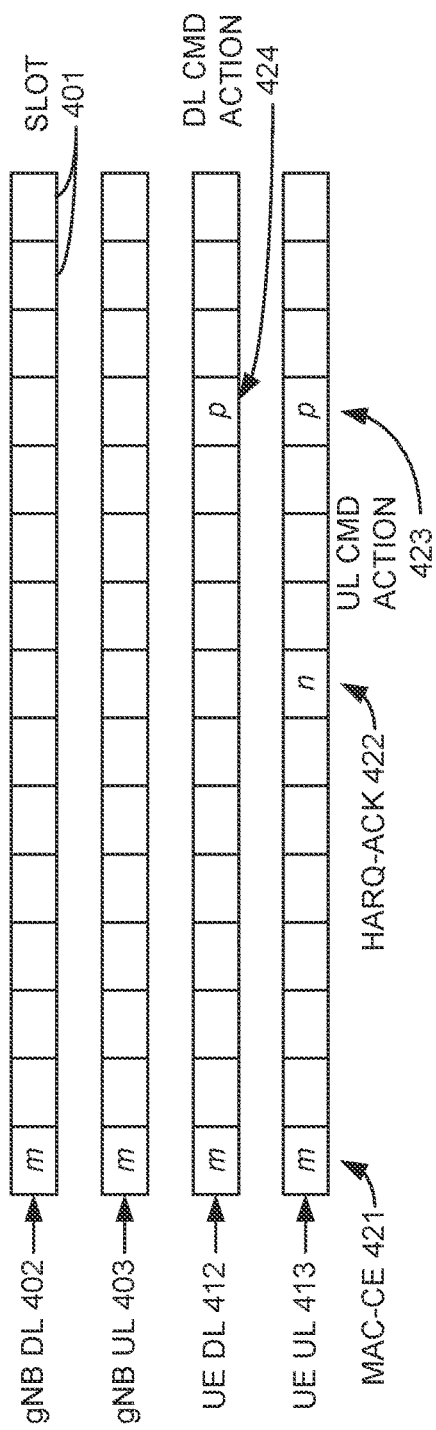
FIG. 4A is a timing diagram illustrating a timing relationship of downlink (DL) and uplink (UL) channels between a UE and an associated BS involving reception and associated action timing of a MAC-CE command when a TA is presumed to be zero, according to an example implementation of the present disclosure.

FIG. 4A is a timing diagram illustrating a timing relationship of downlink (DL) and uplink (UL) channels between a UE (e.g., UE 101 of FIG. 1) and an associated BS (e.g., gNB 102 of FIG. 1) involving reception and associated action time of a MAC-CE command 421 when a TA is presumed to be zero, according to an example implementation of the present disclosure. More specifically, the DL channel at the gNB (e.g., gNB DL 402) and at the UE (e.g., UE DL 412), as well the UL channel at the gNB (e.g., gNB UL 403) and at the UE (e.g., UE UL 413) are presumed to be synchronized (or aligned). As shown in FIG. 4A, MAC-CE command 421 is received (e.g., at UE DL 412) at slot m. After processing of MAC-CE command 421, the UE may transmit a HARQ-ACK 422 at slot n, indicating successful completion of the processing of the MAC-CE command Based on current specifications, the UE and the gNB may both presume that the action time of MAC-CE command 421 (shown as UL command action 423) may occur at slot $p=n+3N_{slot}^{subframe,\mu}+1$, which may be about 3 ms, or three slots after slot n in UE UL 413. Presuming a TA of zero, slot p may align with a corresponding slot p (shown as DL command action 424). In this embodiment, any ambiguity regarding whether slot p refers to slot p of the UL channel (e.g., UE UL 413) or slot p of the DL channel (e.g., UE DL 412), as may currently exist in some 5G NR networks, is relatively unimportant.

Figure 4B:
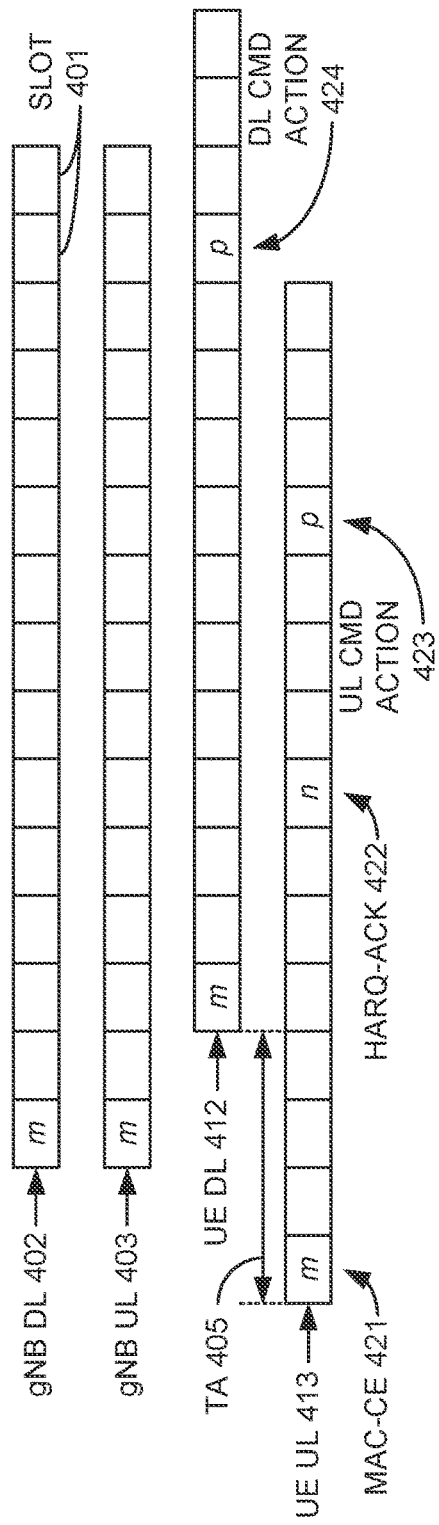
FIG. 4B is a timing diagram illustrating a timing relationship of DL and UL channels between a UE and an associated BS involving reception and associated action timing of a MAC-CE command when a TA is not zero, according to an example implementation of the present disclosure.

However, such potential ambiguity may impose a greater impact on timing if the TA is not zero (or cannot be presumed zero, such as in an NTN scenario). FIG. 4B is a timing diagram illustrating a timing relationship of DL and UL channels between the UE and the BS involving reception and associated action timing of MAC-CE command 421 when a TA 405 is not zero, according to an example implementation of the present disclosure. As shown in FIG. 4B, as a result of TA 405 (e.g., which is greater than zero), the DL at the gNB (e.g., gNB DL 402) and the UL at the gNB (e.g., gNB UL 403) may be synchronized. On the other hand,

TABLE 1

TR 38.821, Section 6.2.1.1: Background
MAC-CE action timing: When the HARQ-ACK corresponding to a PDSCH carrying a MAC-CE command is transmitted in slot n, the corresponding action and the UE assumption on the downlink configuration indicated by the MAC-CE command shall be applied starting from the first slot that is after slot n + $3N_{slot}^{subframe, \mu}$, where $N_{slot}^{subframe, \mu}$ denotes the number of slots per subframe for subcarrier spacing configuration.
TR 38.821, Section 6.2.1.2: Enhancements
For the MAC-CE action timing, the corresponding action and the UE assumption on the downlink configuration indicated by the MAC-CE command shall be applied starting from the first slot that is after slot n + $XN_{slot}^{subframe, \mu}$ + $K_{offset}$, where the value of X may depend on NTN UE capability and may not necessarily be equal to 3. How to determine the value of X is for further study.

However, no common understanding exists as to how legacy MAC-CE action timing (e.g., when the command takes effect) shall work. The fundamental confusion comes from when a UE may assume a MAC-CE command the DL at the UE (e.g., UE DL 412) may lag behind gNB DL 402 due to the propagation delay therebetween. Further, the UL at the UE (e.g., UE UL 413) may lead UE DL 412 (e.g., by TA 405), as well as gNB DL 402 and gNB UL 403.

In the example of FIG. 4B, TA 405 may be relatively small (e.g., 4 ms). Consequently, if the action timing of MAC-CE command 421 is specified in the same manner as in FIG. 4A, UL command action 423 at slot p at UE UL 413 (e.g., defined in the same manner as in FIG. 4A) may not align with DL command action 424 at UE DL 412, thus potentially creating ambiguity regarding the timing of the action of MAC-CE 421 from the perspective of the UE. Additionally, such ambiguity may be exacerbated when greater TA values are involved, such as what may occur in an NTN.

Nonaligned DL/UL Frames

In some examples, the amount of TA may be autonomously acquired by the UE, thus allowing the reference point at which the DL and UL are synchronized or aligned to be defined somewhere other than at the BS (e.g., gNB 102 of FIG. 1). This additional flexibility may impact how a common delay (e.g., between a satellite and a BS) and/or a UE-specific delay (e.g., between the satellite and a UE) may be defined (e.g., for purposes of command action timing).

In the 3GPP Rel-17 working item (WI), a unified framework regarding the requirement of UL time and frequency synchronization has been considered. In one example, placing the reference point for UL timing synchronization at the satellite (e.g., LEO satellite 103 of FIG. 1) has been considered. Accordingly, TA acquisition and updates may be computed considering the satellite position as the reference for UL timing synchronization. As a result, the UL and DL frames may be aligned only at the satellite in such cases.

Figure 5:
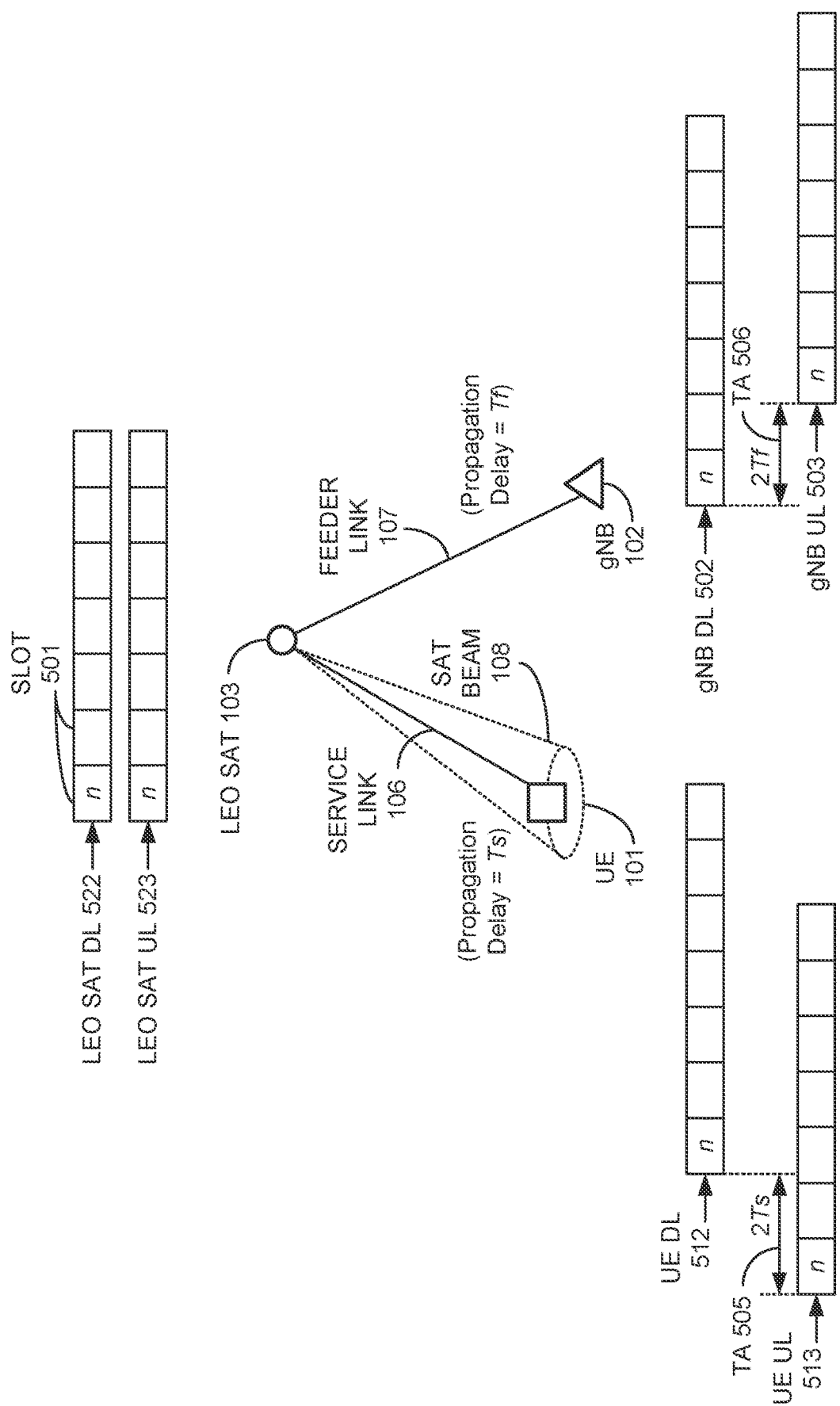
FIG. 5 is a diagram illustrating a timing relationship of DL and UL channels among a UE, a BS, and an intervening satellite, where the DL and UL channels are synchronized at the satellite, according to an example implementation of the present application.

FIG. 5 is a diagram illustrating a timing relationship of DL and UL channels among a UE (e.g., UE 101), a BS (e.g., gNB 102), and an intervening satellite (e.g., LEO satellite 103), where the DL and UL channels (e.g., LEO satellite DL 522 and LEO satellite UL 523) are synchronized at the satellite, according to an example implementation of the present application. In some implementations, UE 101 may be expected to facilitate a time shift of twice a service propagation delay $T_s$ associated with service link 106, which may be referred to as a TA 505 of a UE UL 513 relative to a UE DL 512. This UE-specific delay may change continuously over time due to the movement of LEO satellite 103 along its orbit.

Also, in some implementations, gNB 102 may be expected to facilitate a time shift of twice a feeder propagation delay $T_f$ associated with feeder link 107, which may be referred to as a TA 506 of a gNB DL 502 relative to a gNB UL 503. This gNB-satellite common delay may change continuously over time. In some implementations, this command delay may be broadcast within a System Information Block (SIB) of the NTN. However, the value updating of the common delay may not be constrained by the modification period between the updates. Further, in a Radio Resource Control (RRC) Connected state (e.g., RRC_CONNECTED state), the common delay may be updated via RRC messages in a cell-specific, UE-specific, or group-UE-specific manner.

When the timeline of UL and DL frames are aligned at LEO satellite 103, as depicted in FIG. 5, UE 101 may calculate a TA value autonomously based on GNSS information and satellite ephemeris data (e.g., data describing the location and velocity of LEO satellite 103 as it travels along its orbit) received or stored at UE 101. However, for MAC-CE command action time, calculation of the timings may become even more confusing than described above. For example, if UE 101 is to activate a MAC-CE command "in the first slot that is after slot subframe n+k'," where slot n is the slot at which the MAC-CE command is received at UE 101, the actual time for the first slot could be different based on whether slot n is defined with respect to gNB DL 502, gNB UL 503, UE DL 512, or UE UL 513.

Other Potential Action Timing Ambiguities

Other potential timing ambiguities regarding command action may also exist. For example, HARQ-ACK may be disabled, thus eliminating the slot at which HARQ-ACK may have occurred (e.g., as shown in FIGS. 4A and 4B) as a reference point for command action. Moreover, the action of some commands (e.g., the Timing Advance (TA), DRX (Discontinuous Reception), and Long DRX MAC-CE commands) are based on a number of slots after the slot of a PDSCH at which the command was received instead of on HARQ-ACK timing. Consequently, large TA values (e.g., TA>5 ms for a DL/UL SCS=15 kHz) may result in MAC-CE command action timing being presumed to occur prior to the actual reception of the MAC-CE command at the UE.

Additionally, some 3GPP specifications (e.g., the 3GPP Rel-16 specification) may also be ambiguous with respect to MAC-CE command action timing due to an order of the steps that are taken to determine the action timing. More specifically, the results of this determination may depend on whether the UE determines the action time before or after the TA to be implemented by the UE is applied. In an attempt to address this ambiguity, the terms "logical time" and "actual time" have been defined (e.g., by RAN198-Bis consensus), as follows:

"Logical time" may refer to the circumstance in which DL-to-DL timing differences between Component Carriers (CCs), UL-to-UL timing differences across different Time Alignment Groups (TAGs), and the UL timing advance (TA) are assumed to be zero.

"Actual time" may refer to the circumstance in which DL-to-DL timing differences between CCs, UL-to-UL timing differences across different TAGs, and the UL TA are assumed to be as the UE actually observes those differences.

In some circumstances, MAC-CE action time may be categorized as occurring in logical time. Consequently, the UE may determine a logical MAC-CE action based on the specification text that applies for the associated MAC-CE command, and then apply the MAC-CE action timing after the TA is employed. However, presuming an agreement is reached on this approach in determining MAC-CE action time for a particular NTN, other ambiguities, as well as the large propagation delays associated with such networks, action timing issues, as described above, may still prevail.

NTN Action Timing Framework

In some implementations, to address the above-described issues, an enhanced approach specifically directed to action timing in an NTN, as described in greater detail below, may include a number of features:

The network (e.g., via gNB 102 of FIG. 1) may signal (e.g., explicitly) one or more values to the UE (e.g., UE 101 of FIG. 1). In some implementations, for example, the network may indicate a scheduling offset $\Delta_{NTN}$ to delay MAC-CE action. In some implementations, the network may also indicate a new maximum value for an absolute timing advance $N_{NTN-TA,max}$ for UE 101 to calculate MAC-CE action time. Also, in some implementations, the network may indicate a new maximum value for a UE autonomous timing advance $N_{UE-TA}$, also for UE 101 to calculate the MAC-CE action time.

The network may also provide (e.g., implicitly) various types of data that may aid the UE in determining a MAC-CE action time. In some implementations, for example, the network may provide NTN types or satellite ephemeris (e.g., an NTN employing geostationary orbit (GEO) or LEO satellites) to imply a maximum roundtrip time (RTT) as an additional delay for MAC-CE action time. In some implementations, the network may provide a cell-specific scheduling offset $K_{offset}$ (e.g., in System Information Block 1 (SIB1) or an NTN SIB) for initial access, to imply an additional delay for MAC-CE action time. In some implementations, the network may provide a scheduling offset for Msg3 (e.g., a PUSCH scheduled by a random-access response (RAR) UL grant) to imply an additional delay for MAC-CE action time. In some implementations, the network may also provide a scheduling offset for the start timing of a random-access response window (e.g., ra-Response Window) to imply an additional delay for MAC-CE action time.

In some implementations, the network signaling noted above may be provided via system information (SI), cell-specific or UE-specific signaling, RRC messages, MAC-CE commands, or DCI formats.

In some implementations, some methods of timing compensation may be performed by the UE. For example, the UE may apply an autonomous TA applied for a Physical Random-Access Channel (PRACH) preamble during random access for the MAC-CE action time. In some examples, the UE may use a new additional delay based on UE capability. In some implementations, the UE may apply or activate (e.g., as soon as possible after finishing any required processing time) the received MAC-CE command before sending a HARQ-ACK or before a slot indicated by the network.

In some implementations, the UE may further adjust the MAC-CE action time based on the current prevailing circumstances or environment:

When the network indicates (e.g., by way of system information (SI)) that the UL/DL frames are non-aligned at the BS (e.g., gNB 102 of FIG. 1), the UE may apply a new MAC-CE action (delay) time (e.g., referred to herein as $K_{mac}$) and/or a specific UE DL or UE UL slot number in which to apply the command, to accommodate the nonaligned frames at the gNB.

When HARQ-ACK is disabled, the UE may employ the same MAC-CE action time as if the HARQ-ACK were still to be transmitted if a slot number for the disabled HARQ-ACK transmission is still provided. Otherwise, if no slot number is provided for the disabled HARQ-ACK, the UE may apply the same MAC-CE latency as the latency specified for a TA MAC-CE command When the network provides information for UL time and/or frequency (e.g., a scheduling offset, or propagation delay information for a service link or a feeder link), the UE may apply this information to derive the MAC-CE latency.

When the network provides information to distinguish NTN or terrestrial network (TN) cells, or to distinguish GEO or LEO types of satellite payload, the UE may apply this information for calculating the maximum RTT to derive MAC-CE latency.

When the UE reports UE capability to the network, the UE may apply the reported value (e.g., UE processing time) to derive MAC-CE latency.

When the UE reports a UE autonomous TA to the network by receiving an indication or a request from the network, the UE may apply the reported value (e.g., the absolute TA applied for PRACH preamble) to derive MAC-CE latency.

In some examples, 3GPP Rel-17 features may be provided atop the pre-existing Rel-16 framework. Consequently, new UE behaviors, as discussed herein, may be triggered only by new conditions, and legacy UE behaviors may be expected if the new conditions are not met. In some implementations, the new conditions may be new parameters or features introduced specifically for NTN scenarios as discussed herein. Further, in some implementations, the new UE behavior intended for NTNs may include the use of an updated MAC-CE action time (e.g., $K_{mac}$) for one or more MAC-CE commands, as described more fully below.

Since MAC-CE action latency may be expected to be longer in an NTN than in a TN, a greater probability may exist in an NTN that the command action may be interrupted by an active UL BWP change. For example, a UE may change an active UL BWP between the time a MAC-CE command is received and the time at which a corresponding adjustment for the UL transmission timing is applied. In this case, the UE may determine the action timing of the adjustment based on the SCS configuration of the new active UL BWP. If, instead, the UE changes an active UL BWP after action of the command (e.g., before receiving a TA MAC-CE command on the new active UL BWP), the UE may assume the same SCS configuration both before and after the active UL BWP change.

Timing Advance (TA) MAC-CE Command

For a TA command received during a UL slot m and for the UL transmissions (other than a PUSCH scheduled by a RAR UL grant), the corresponding adjustment of the UL transmission timing may apply from the beginning of uplink slot m+k+1, where $$k = \left\lceil N_{slot}^{subframe,\mu} \cdot \frac{(N_{T,1} + N_{T,2} + N_{TA,max} + 0.5)}{T_{sf}} \right\rceil,$$

and where:

If the UE camps on (e.g., is served by) a terrestrial network (TN), $N_{TA,max}=N_{TN-TA,max}$ may be the maximum TA value, in ms, that may be provided by a TA command (e.g., a 12-bit field). If, instead, the UE camps on an NTN, $N_{TA,max}=N_{NTN-TA,max}$ may be the maximum absolute timing advance value, in ms (e.g., the maximum time gap between UL and DL frames that may be used by the UE that has received the MAC-CE command in the serving cell);

$N_{T,1}$ is a time duration, in ms, of $N_1$ symbols corresponding to a PDSCH processing time for UE processing capability when additional an PDSCH Demodulation Reference Signal (DMRS) is configured;

$N_{T,2}$ is a time duration, in ms, of $N_2$ symbols corresponding to a PUSCH preparation time for UE processing capability;

$N_{slot}^{subframe,\mu}$ is the number of slots per subframe;

0.5 is presumed to be the MAC processing latency, in ms;

$T_{sf}$ is the subframe duration of 1 ms; and $N_1$ and $N_2$ are determined according to the minimum SCS among the SCSs of all configured UL BWPs for all uplink carriers in the TAG and for all configured DL BWPs for the corresponding downlink carriers.

In some implementations, $N_{NTN-TA,max}$ may be determined according to the minimum SCS among the SCSs of all configured UL BWPs for all uplink carriers in the TAG or all configured initial UL BWPs provided by initialUplinkBWP. In some implementations, initialUplinkBWP may refer to the dedicated (e.g., UE-specific) configuration for the initial UL BWP (e.g., UL BWP #0).

In some implementations, the UE may identify an NTN cell by explicit indication of an NTN cell in system information (e.g., SIB1 or other SIBs), or by implicit indication of an NTN cell in system information (e.g., NTN PLMN IDs, ephemeris, NTN SIBs, an NTN requirement as UE autonomous TA, or an NTN scheduling offset for RAR grant scheduled PUSCH).

UE accesses an NTN cell and identifies the associated NTN type as "C1: LEO transparent payload," $N_{NTN-TA,max}$ may be determined as 25.77 ms, and the slot number may be calculated further based on the configured SCS on UL carriers.

TABLE 2

| NTN scenarios | A<br>GEO<br>transparent<br>payload | B<br>GEO<br>regenerative<br>payload | C1<br>LEO<br>transparent<br>payload | C2 | D1<br>LEO<br>regenerative<br>payload | D2 |
|---|---|---|---|---|---|---|
| Satellite altitude | 35786 km | | | | 600 km | |
| Maximum propagation delay contribution to the Round-Trip Delay on the radio interface between the gNB and the UE | 541.46 ms<br>(Worst case) | 270.73 ms | 25.77 ms | | 12.89 ms | |

NOTE:
The speed of light used for delay calculation is 299792458 m/s.

In some implementations, the value of $N_{NTN-TA,max}$ may be explicitly provided by the network, which may be signaled in system information (e.g., SIB1 or NTN SIBs), in UE-group common signaling (e.g., DCI format), or in UE-specific signaling or groupcast signaling (e.g., RRC messages, MAC CE commands, or DCI formats).

In some implementations, the value of $N_{NTN-TA,max}$ may be implicitly provided by the network (e.g., via calculation using other values or parameters received from the network). For example, $N_{NTN-TA,max}=N_{UE-TA}+N_{NTN-TA,max}$, where $N_{UE-TA}$ is the absolute TA value, in ms, that is derived by the UE (e.g., a UE autonomous TA derived from UE GNSS and satellite ephemeris, which may be used to send PRACH preambles during initial access).

- In some implementations, $N_{UE-TA}$ may be derived by the network via the random-access procedure (e.g., for 4-step RA).
- In some implementations, $N_{UE-TA}$ may be reported from the UE via RRC messages, MAC CE commands, and/or UCI reporting (e.g., for 2-step RA).
- In some implementations, $N_{UE-TA}$ may be indicated by the network in SIB1 or NTN SIBs if the UE cannot derive a UE autonomous TA (e.g., no GNSS capability at the UE). In this case, $N_{UE-TA}$ might be equal to the maximum roundtrip time (RTT) in the serving cell.
- In some implementations, $N_{UE-TA}$ may be the maximum value of the UE autonomous TA that the UE is allowed to apply, which may be provided by the network or indicated by specifications according to NTN scenarios.
- In some implementations, the slot number of $N_{UE-TA}$ may be determined according to the minimum SCS among the SCS's of all configured UL BWPs for all uplink carriers in the TAG and/or all configured initial UL BWPs provided by initialUplinkBWP.
- In some implementations, $N_{NTN-TA,max}$ may be associated with, derived from, or equal to the transmission timing (e.g., with a scheduling offset of RAR grant scheduled PUSCH, or with the start timing of ra-ResponseWindow). These scheduling offsets (e.g., $K_{offset}$ during initial access) may be provided in system information (e.g., SIB1 or NTN SIBs).
- In some implementations, $N_{NTN-TA,max}$ may be associated with the maximum RTT based on NTN types identified by the UE. For example, as shown in Table 2 below, when the In some implementations, for a TA command received on uplink slot n and for UL transmissions, other than a PUSCH scheduled by a RAR UL grant, the corresponding adjustment of the UL transmission timing may apply from the beginning of uplink slot $n+k+1+\Delta_{NTN}$ (or $K_{offset}$), where $\Delta_{NTN}$ refers to an additional SCS-specific slot delay value (e.g., provided via RRC messages, MAC CE commands, and/or DCI formats by the network).

In some implementations, the value of $\Delta_{NTN}$ may be determined based on UE capability reporting. For example, the network may initiate the UE capability reporting to a UE that is in an RRC_CONNECTED state when the network requires (additional) UE radio access capability information. In some implementations, the UE may compile and transfer its UE capability information upon receiving a UECapabilityEnquiry from the network. Also, the values of $N_{NTN-TA,max}$ and $N_{UE-TA}$ may be determined based on UE capability.

DRX MAC-CE Command

In some implementations, the active time associated with a Discontinuous Reception (DRX) MAC-CE command may be enhanced based on a plurality of circumstances. For example, when (1) DRX is configured in current symbol n, (2) drx-onDurationTimer of the DRX group is not running considering grants or assignments scheduled on serving cell(s) in this DRX Group, and (3) a DRX MAC-CE command or Long DRX MAC-CE command is received either (a) at least 4 ms before symbol n, if the UE camps on a TN cell, or (b) at least 4 ms+$\Delta_{NTN}$ before symbol n, if the UE camps on an NTN cell, then the UE may not report CSI on this PUCCH. $\Delta_{NTN}$ may refer to an additional SCS-specific slot delay value (e.g., provided via RRC messages, MAC-CE commands, and/or DCI formats). Note that the drx-onDurationTimer parameter may be used for defining the duration at the beginning of a DRX Cycle.

In some implementations, the value of $\Delta_{NTN}$ may be determined based on UE capability reporting. For example, the network, may initiate a UE capability enquiry procedure to a UE in the RRC_CONNECTED state when it needs (additional) UE radio access capability information. In some implementations, the UE may compile and transfer its UE capability information upon receiving a UECapabilityEnquiry from the network.

MAC-CE Commands Applied to UL Channels

For MAC-CE commands used for UL channels, the MAC-CE action time may be as indicated below for each associated circumstance:

PUCCH Power Control: If the UE is provided PUCCH-SpatialRelationInfo, the UE may obtain a mapping, by an index provided by p0-PUCCH-Id, between a set of pucch-SpatialRelationInfold values and a set of p0-PUCCH-Value values. If the UE is provided more than one value for pucch-SpatialRelationInfold and the UE receives an activation command indicating a value of pucch-SpatialRelationInfold, the UE may determine the p0-PUCCH-Value value through the link to a corresponding p0-PUCCH-Id index. The UE may apply the activation command in the first slot that is after slot $n+3 \cdot N_{slot}^{subframe,\mu}$, where n is the slot where the UE would transmit a PUCCH with HARQ-ACK information for the PDSCH providing the activation command, and $\mu$ is the SCS configuration for the PUCCH if HARQ-ACK is enabled.

PUCCH Spatial Information: If the UE receives a MAC-CE activation command for one of the TCI states, the UE may apply the activation command in the first slot that is after slot $n+3N_{slot}^{subframe,\mu}$, where n is the slot where the UE would transmit a PUCCH with HARQ-ACK information for the PDSCH providing the activation command, and $\mu$ is the SCS configuration for the PUCCH. The active BWP may be defined as the active BWP in the slot when the activation command is applied if HARQ-ACK is enabled.

Semi-Persistent Reporting on PUCCH: For semi-persistent reporting on PUCCH, the PUCCH resource used for transmitting the CSI report may be configured by reportConfigType. Semi-persistent reporting on PUCCH may be activated by an activation command, which selects one of the semi-persistent reporting settings for use by the UE on the PUCCH. When the UE would transmit a PUCCH with HARQ-ACK information in slot n corresponding to the PDSCH carrying the activation command, the indicated semi-persistent reporting setting may be applied starting from the first slot after slot $n+3N_{slot}^{subframe,\mu}$, where $\mu$ is the SCS configuration for the PUCCH if HARQ-ACK is enabled.

UE Sounding Procedure: When a UE receives an activation command for a Sounding Reference Signal (SRS) resource (e.g., semi-persistent SRS), and when the UE would transmit a PUCCH with HARQ-ACK information in slot n corresponding to the PDSCH carrying the activation command, the corresponding actions and the UE assumptions on SRS transmission corresponding to the configured SRS resource set may be applied to start from the first slot after slot $n+3N_{slot}^{subframe,\mu}$, where $\mu$ is the SCS configuration for the PUCCH. The activation command may also contain spatial relation assumptions provided by a list of references to reference signal IDs (e.g., one per element of the activated SRS resource set) if HARQ-ACK is enabled.

In some implementations, when HARQ-ACK is enabled and an NTN cell has been identified, the UE may apply received MAC-CE command(s) following the same MAC-CE latency based on the latency of applying a TA MAC-CE command In this case, the MAC-CE action time for all MAC-CE commands may be unified and may be independent of the timing of HARQ-ACK transmission. In some implementations, when HARQ-ACK is enabled, the UE may apply a received MAC-CE command after a pre-determined/(pre-)configured time offset from the reception of a PDSCH that carries the received MAC-CE command or from a PDCCH that schedules the PDSCH carrying the received MAC-CE command In one implementation, the behavior may be further conditioned on whether the camping/residing cell of the UE is an NTN cell.

In some implementations, when HARQ-ACK is disabled, and a UE receives a PDSCH that provides an activation command in uplink slot m, the UE may apply the activation command according to the following timing:

In the first slot after slot subframe $m+k_1+3 \cdot N_{slot}^{subframe,\mu}$, where $k_1$ is indicated by the PDSCH-to-HARQ_feedback timing indicator field in the DCI format that schedules the PDSCH with the activation command, and $\mu$ is the SCS configuration for the PUCCH; or From the beginning of uplink slot m+k+1, where $$k = \left\lceil N_{slot}^{subframe,\mu} \cdot \frac{(N_{T,1} + N_{T,2} + N_{TA,max} + 0.5)}{T_{sf}} \right\rceil,$$

as defined above.

In some implementations, if the UE changes an active UL BWP between the time a MAC-CE command is received and the time the corresponding command is applied or activated, the UE may determine the configuration carried by, or applied for, the MAC CE command based on the SCS of the new active UL BWP. If, instead, the UE changes an active UL BWP after applying the command, the UE may assume the same SCS configuration carried by, or applied for, the command before and after the active UL BWP change.

MAC-CE Commands Applied to DL Channels

For MAC-CE commands used for DL channels, the MAC-CE action time may be as indicated below for each associated circumstance:

Semi-Persistent Zero-Power (ZP) Channel State Information-Reference Signal (CSI-RS): When the UE would transmit a PUCCH with HARQ-ACK information in slot n corresponding to the PDSCH carrying the activation command, for ZP CSI-RS resource(s), the corresponding action and the UE assumption on the PDSCH RE mapping corresponding to the activated ZP CSI-RS resource(s) may be applied starting from the first slot after slot $n+3N_{slot}^{subframe,\mu}$, where m is the SCS configuration for the PUCCH, if HARQ-ACK is enabled.

Antenna ports quasi-co-location: If the UE receives a MAC-CE activation command for one of the Transmission Configuration Indicator (TCI) states, the UE may apply the activation command in the first slot after slot subframe $n+3N_{slot}^{subframe,\mu}$, where n is the slot where the UE would transmit a PUCCH with HARQ-ACK information for the PDSCH providing the activation command, and $\mu$ is the SCS configuration for the PUCCH. The active BWP may be defined as the active BWP in the slot when the activation command is applied if HARQ-ACK is enabled.

Aperiodic CSI-RS: When the UE would transmit a PUCCH with HARQ-ACK information in slot n corresponding to the PDSCH carrying the sub-selection indication, the corresponding action and UE assumption on the mapping of the selected CSI trigger state(s) to the codepoint(s) of DCI CSI request field may be applied starting from the first slot after slot $n+3N_{slot}^{subframe,\mu}$, where $\mu$ is the SCS configuration for the PUCCH if HARQ-ACK is enabled.

Semi-Persistent CSI-RS: When a UE receives a deactivation command for activated CSI-RS/CSI-IM (Interference Measurement) resource set(s) associated with configured CSI resource setting(s), and when the UE would transmit a PUCCH with HARQ-ACK information in slot n corresponding to the PDSCH carrying the deactivation command, the corresponding actions and UE assumption on cessation of CSI-RS/CSI-IM transmission corresponding to the deactivated CSI-RS/CSI-IM resource set(s) may apply starting from the first slot after slot n+3$N_{slot}^{subframe,\mu}$, where $\mu$ is the SCS configuration for the PUCCH, if HARQ-ACK is enabled.

In some implementations, when HARQ-ACK is enabled and an NTN cell has been identified, the UE may apply received MAC-CE command(s) following the same MAC-CE latency based on the latency of applying a TA MAC-CE command In this case, the MAC-CE action time for all MAC-CE commands may be unified and may be independent of the timing of HARQ-ACK transmission. In some implementations, when HARQ-ACK is enabled, the UE may apply a received MAC-CE command after a predetermined/(pre-)configured time offset from the reception of a PDSCH that carries the received MAC-CE command or from a PDCCH that schedules the PDSCH carrying the received MAC-CE command In one implementation, the behavior may be further conditioned on the camping/residing cell of the UE being an NTN cell.

In some implementations, when HARQ-ACK is disabled, and a UE receives a PDSCH that provides an activation command in uplink slot m, the UE may apply the activation command according to the following timing:

In the first slot after slot subframe m+$k_1$+3·$N_{slot}^{subframe,\mu}$, where $k_1$ is indicated by the PDSCH-to-HARQ_feedback timing indicator field in the DCI format that schedules the PDSCH with the activation command, and $\mu$ is the SCS configuration for the PUCCH; or From the beginning of uplink slot m+k+1, where $$k = \left\lceil N_{slot}^{subframe,\mu} \cdot \frac{(N_{T,1} + N_{T,2} + N_{TA,max} + 0.5)}{T_{sf}} \right\rceil,$$

as defined above.

In some implementations, when nonaligned DL/UL frames are enabled at the gNB, an additional indication in system information (SI) may be provided to the UE. For example, if the UE receives a PDSCH that provides an activation command in logical uplink/downlink slot m (e.g., TA=0), the UE may determine the logical uplink slot p=m+$k_1$+3·$N_{slot}^{subframe,\mu}$+1 and apply the activation command in the logical downlink slot p. In some examples, $k_1$ (or alternatively, $k_{mac}$) may be a number of delay slots associated with the MAC-CE command when the DL and UL frames are nonaligned at the gNB.

In some implementations, if the UE changes an active UL BWP between the time a MAC CE command is received and the time a corresponding command is applied, the UE may determine the configuration based on the SCS of the new active UL BWP. If the UE changes an active UL BWP after applying the command, the UE may assume the same configuration before and after the active UL BWP change.

In accordance with at least some of the implementations noted above, a UE that camps on an NTN cell may (1) receive a RRC message including an indication of a maximum absolute TA value in the NTN cell and/or (2) receive an RRC message including an indication of a maximum TA value that the UE is allowed to apply for PRACH preamble transmission in the NTN cell.

Figure 6:
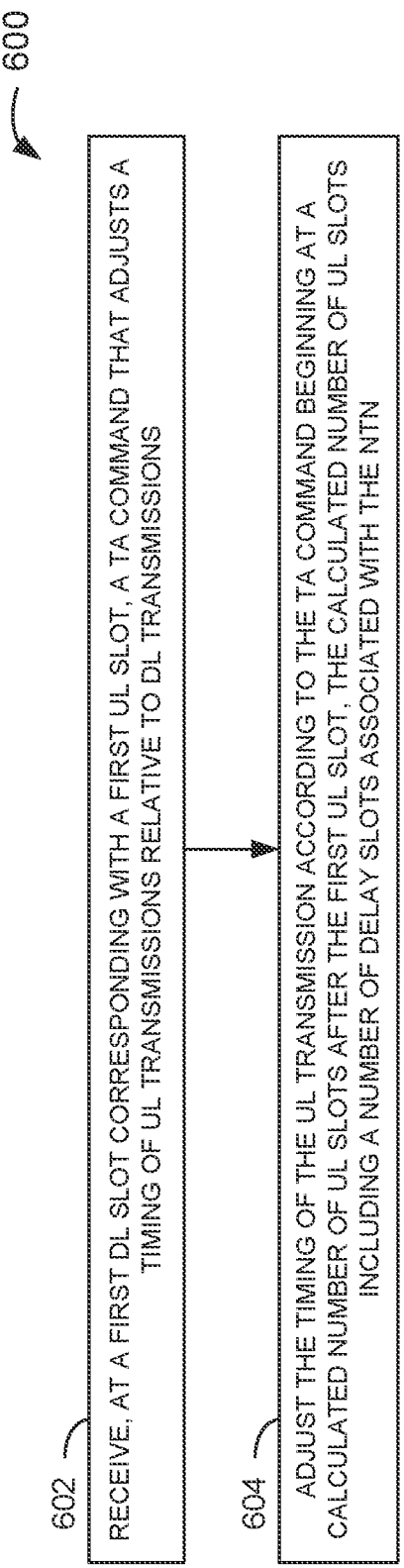
FIG. 6 is a flowchart illustrating a method performed by a UE to implement action timing for a MAC-CE TA command received from a BS in an NTN, according to an example implementation of the present application.

FIG. 6 is a flowchart illustrating a method 600 performed by a UE (e.g., UE 101 of FIG. 1) to implement action timing for a MAC-CE TA command received from a BS (e.g., gNB 102 of FIG. 1) in an NTN (e.g., NTN 100 of FIG. 1), according to an example implementation of the present application.

In method 600, at operation 602, the UE may receive, at a first DL slot corresponding with a first UL slot, a TA command (e.g., a TA MAC-CE command) that adjusts a timing of UL transmissions relative to DL transmissions. In some implementations, the first UL slot is the UL slot that may correspond with the first DL slot in logical time (e.g., presuming a current TA of zero being employed by the UE when performing UL transmissions).

At operation 604, the UE may adjust the timing of the UL transmissions according to the TA command beginning at a calculated number of UL slots after the first UL slot. In some implementations, the calculated number of UL slots may include a number of delay slots associated with the NTN. In some implementations, the calculated number of UL slots after the first UL slot may be expressed as $K_{offset}$k+1, or alternatively, $\Delta_{NTN}$ k+1, as described above. In some implementations, $K_{offset}$ and/or $\Delta_{NTN}$ may be a cell-specific scheduling offset and/or an SCS-specific slot delay associated with the NTN. In some implementations, $$k = \left\lceil N_{slot}^{subframe,\mu} \cdot \frac{(N_{T,1} + N_{T,2} + N_{TA,max} + 0.5)}{T_{sf}} \right\rceil,$$

as described above, which may be an additional delay (e.g., a delay related, in part, to UE processing latency). In some implementations, the UE may receive $K_{offset}$ and/or $\Delta_{NTN}$ from the BS by way of system information (SI) (e.g., SIB1 or NTN SIBs), RRC signaling, a MAC-CE command, and/or a DCI format. In some implementations, the UE may receive k from the BS by way of RRC signaling and/or other communications.

Figure 7:
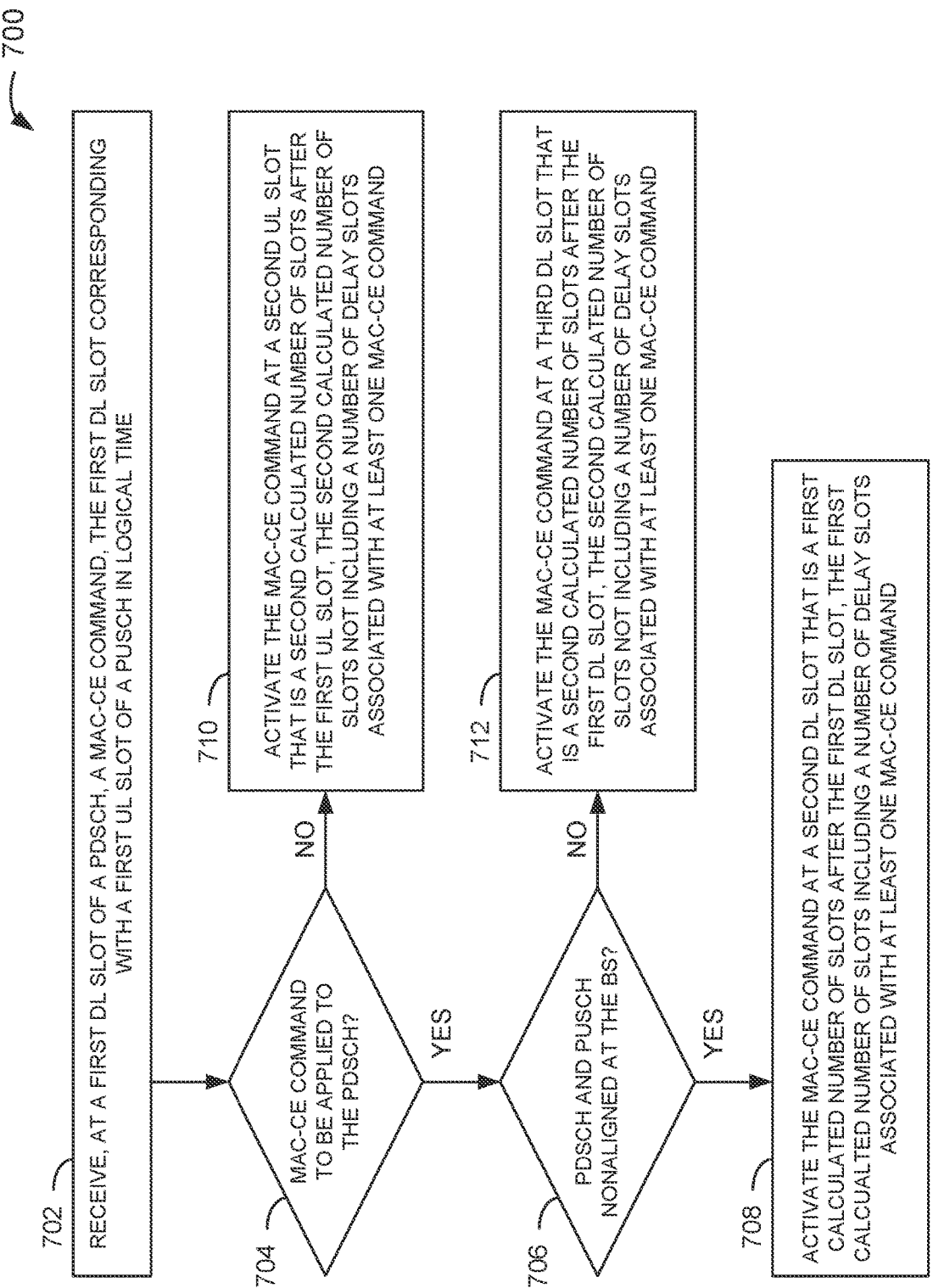
FIG. 7 is a flowchart illustrating a method performed by a UE to activate a MAC-CE command received from a BS in an NTN, wherein the action timing is based on whether a PDSCH or PUSCH is affected, and on whether the PDSCH and PUSCH are aligned at the BS, according to an example implementation of the present application.

FIG. 7 is a flowchart illustrating a method 700 performed by a UE (e.g., UE 101 of FIG. 1) to activate a MAC-CE command received from a BS (e.g., gNB 102 of FIG. 1) in an NTN (e.g., NTN 100 of FIG. 1), wherein the action timing is based on whether a PDSCH or PUSCH is affected, and on whether the PDSCH and PUSCH are aligned at the BS, according to an example implementation of the present application.

In method 700, at operation 702, the UE may receive, at a first DL slot of a PDSCH, a MAC-CE command In some implementations, the first DL slot may correspond to a first UL slot of a PUSCH in logical time (e.g., presuming a current TA of zero being employed by the UE when performing UL transmissions).

At operation 704, the UE may determine whether the MAC-CE is to be applied to, or is to affect, the PDSCH. If the MAC-CE is to be applied to the PDSCH, the UE may proceed to operation 706. At operation 706, the UE may determine whether the PDSCH and the PUSCH are nonaligned at the BS. If the PDSCH and the PUSCH are nonaligned at the BS, the UE may proceed to operation 708. At operation 708, the UE may activate the MAC-CE command at a second DL slot that is a first calculated number of slots after the first DL slot. In some implementations, the first calculated number may include a number of delay slots associated with at least one MAC-CE command (e.g., when the PDSCH and the PUSCH are nonaligned at the BS).

In some implementations, the first calculated number of slots after the first DL slot may be $k_{mac}+k+1$. In some implementations, $k_{mac}$ may be the number of delay slots associated with the at least one MAC-CE command when the PDSCH and the PUSCH are nonaligned at the BS. In some implementations, $$k = \left\lceil N_{slot}^{subframe,\mu} \cdot \frac{(N_{T,1} + N_{T,2} + N_{TA,max} + 0.5)}{T_{sf}} \right\rceil,$$

is described above, which may be an additional delay (e.g., a delay related, in part, to UE processing latency).

Returning to operation 706, if the PDSCH and the PUSCH are aligned at the BS, the UE may proceed to operation 712. At operation 712, the UE may activate the MAC-CE at a third DL slot that is a second calculated number of slots after the first DL slot. In some implementations, the second calculated number of slots may not include the number of delay slots associated with the at least one MAC-CE command (e.g., may not include $k_{mac}$). In such cases, the calculated number of slots may be k+1.

Returning to operation 704, if the MAC-CE is not to be applied to the PDSCH, the UE may proceed to operation 710. At operation 710, the UE may activate the MAC-CE command at a second UL slot that is a second calculated number of slots after the first UL slot. In some implementations, the second calculated number of slots may not include the number of delay slots associated with the at least one MAC-CE command (e.g., may not include $k_{mac}$). In such cases, the calculated number of slots may be k+1.

Figure 8:
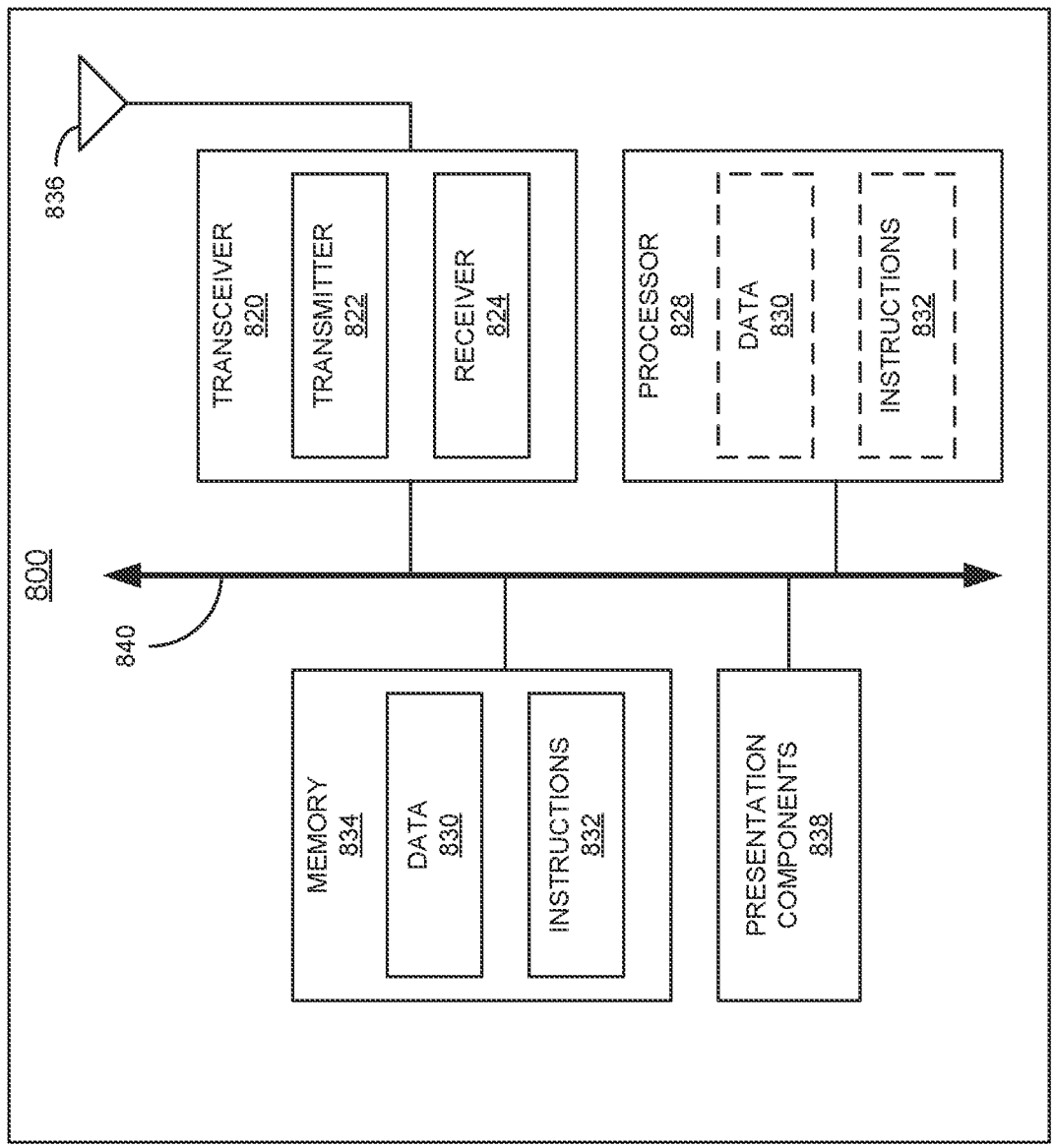
FIG. 8 is a block diagram illustrating a node for wireless communication, according to an example implementation of the present application.

FIG. 8 illustrates a block diagram of a node 800 for wireless communication, according to one example implementation of the present application. As shown in FIG. 8, node 800 may include a transceiver 820, a processor 828, a memory 834, one or more presentation components 838, and at least one antenna 836. Node 800 may also include a Radio Frequency (RF) spectrum band module, a base station communications module, a network communications module, and a system communications management module, input/output (I/O) ports, I/O components, and power supply (not explicitly shown in FIG. 8). Each of these components may be in communication with each other, directly or indirectly, over one or more buses 840.

Transceiver 820, having a transmitter 822 (e.g., transmitting/transmission circuitry) and a receiver 824 (e.g., receiving/reception circuitry), may be configured to transmit and/or receive time and/or frequency resource partitioning information. In some implementations, transceiver 820 may be configured to transmit in different types of subframes and slots including, but not limited to, usable, non-usable and flexibly usable subframes and slot formats. Transceiver 820 may be configured to receive data and control channels.

Node 800 may include a variety of computer-readable media. Computer-readable media can be any available media that can be accessed by node 800 and include both volatile and non-volatile media, removable and non-removable media. By way of example, and not limitation, computer-readable media may include computer storage media and communication media. Computer storage media include both volatile and non-volatile, removable and non-removable media implemented in any method or technology for storage of information, such as computer-readable instructions, data structures, program modules or other data. Computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media do not include a propagated data signal. Communication media typically embody computer-readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media. Combinations of any of the above should also be included within the scope of computer-readable media.

Memory 834 may include computer-storage media in the form of volatile and/or non-volatile memory. Memory 834 may be removable, non-removable, or a combination thereof. Exemplary memory includes solid-state memory, hard drives, optical-disc drives, etc. As illustrated in FIG. 8, memory 834 may store computer-readable, computer-executable instructions 832 (e.g., software codes) that are configured to, when executed, cause processor 828 to perform various functions described herein, for example, with reference to FIGS. 1 through 8. Alternatively, instructions 832 may not be directly executable by processor 828 but be configured to cause node 800 (e.g., when compiled and executed) to perform various functions described herein.

Processor 828 may include an intelligent hardware device, for example, a central processing unit (CPU), a microcontroller, an ASIC, etc. Processor 828 may include memory. Processor 828 may process data 830 and instructions 832 received from memory 834, and information through transceiver 820, the baseband communications module, and/or the network communications module. Processor 828 may also process information to be sent to transceiver 820 for transmission through antenna 836, to the network communications module for transmission to a core network.

One or more presentation components 838 presents data indications to a person or other device. For example, one or more presentation components 838 include a display device, speaker, printing component, vibrating component, etc.

From the above description, it is manifest that various techniques can be used for implementing the concepts described in the present application without departing from the scope of those concepts. Moreover, while the concepts have been described with specific reference to certain implementations, a person of ordinary skill in the art may recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A method for a user equipment (UE) connected to a non-terrestrial network (NTN), the method comprising:
receiving, from a base station (BS) of the NTN, at a downlink (DL) slot associated with an uplink (UL) slot n, a physical downlink shared channel (PDSCH) carrying a timing advance (TA) command medium access control (MAC) control element (CE);

receiving, from the BS, a value for $K_{offset}$ via system information (SI);

adjusting a timing of uplink (UL) transmissions to the BS according to the received TA command MAC CE; and applying, from a beginning of the UL slot $n+k+1+K_{offset}$, the adjusted timing to adjust a TA value for subsequent UL transmissions, wherein:

$K_{offset}$ is a common delay broadcast by the BS to a plurality of UEs connected to the NTN including the UE, k is an additional delay specific to the UE, and a duration of the additional delay is based on a processing latency of the UE.

2. The method of claim 1, further comprising receiving, from the BS, a value for k via radio resource control (RRC) signaling.

3. A user equipment (UE) connected to a non-terrestrial network (NTN), the UE comprising:

one or more non-transitory computer-readable media storing one or more computer-executable instructions; and at least one processor coupled to the one or more non-transitory computer-readable media, and configured to execute the one or more computer-executable instructions to cause the UE to:

receive, from a base station (BS) of the NTN, at a downlink (DL) slot associated with an uplink (UL) slot n, a physical downlink shared channel (PDSCH) carrying a timing advance (TA) command medium access control (MAC) control element (CE);

receive, from the BS, a value for $K_{offset}$ via system information (SI);

adjust a timing of uplink (UL) transmissions to the BS according to the received TA command MAC CE; and apply, from a beginning of the UL slot $n+k+1+K_{offset}$, the adjusted timing to adjust a TA value for subsequent UL transmissions, wherein:

$K_{offset}$ is a common delay broadcast by the BS to a plurality of UEs connected to the NTN including the UE, k is an additional delay specific to the UE, and a duration of the additional delay is based on a processing latency of the UE.

4. The UE of claim 3, wherein the one or more computer-executable instructions, when executed by the at least one processor, further cause the UE to receive, from the BS, a value for k via radio resource control (RRC) signaling.

* * * * *